(12) United States Patent
Mimura

(10) Patent No.: US 11,685,255 B2
(45) Date of Patent: Jun. 27, 2023

(54) FUEL TANK CAP LOCKING DEVICE

(71) Applicant: ASAHI DENSO CO., LTD., Hamamatsu (JP)

(72) Inventor: Yohei Mimura, Shizuoka (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 416 days.

(21) Appl. No.: 16/892,969

(22) Filed: Jun. 4, 2020

(65) Prior Publication Data

US 2020/0384853 A1    Dec. 10, 2020

(30) Foreign Application Priority Data

Jun. 7, 2019  (JP) ............................. JP2019-107019
Jul. 31, 2019 (JP) ............................. JP2019-141010

(51) Int. Cl.
*B60K 15/04*    (2006.01)
*B60R 25/01*    (2013.01)
(Continued)

(52) U.S. Cl.
CPC .......... *B60K 15/0409* (2013.01); *B60R 25/01* (2013.01); *B60R 25/24* (2013.01);
(Continued)

(58) Field of Classification Search
CPC .... B60K 15/00; B60K 15/04; B60K 15/0409; B60K 2015/0412; B60K 2015/0416;
(Continued)

(56) References Cited

U.S. PATENT DOCUMENTS 4,468,058 A *  8/1984  Haagen ............. B60K 15/0409
                                                       292/144
9,579,971 B2 *  2/2017  Koishikawa ....... B60K 15/0406
(Continued)

FOREIGN PATENT DOCUMENTS

IT       1393382 B1     4/2012
JP    2005-075308 A     3/2005
(Continued)

OTHER PUBLICATIONS

Extended European Search Report issued in Patent Application No. 20178247.1 dated Dec. 7, 2020.
(Continued)

*Primary Examiner* — Nathan Cumar
(74) *Attorney, Agent, or Firm* — Pearne & Gordon LLP

(57) ABSTRACT

A fuel tank cap locking device includes: a cap configured to open and close a fuel filler port; an operation unit; an engagement unit movable in conjunction with the operation unit; and a lock unit configured to lock movement of the engagement unit from the engagement position to the allowable position. The lock unit includes a lock member that is movable between an interference position where the lock member interferes with an interfered portion formed at a predetermined position of the engagement unit and locks, and a non-interference position where the lock member does not interfere with the interfered portion and the lock is released when the engagement unit moves from the engagement position to the allowable position by the swing operation of the operation unit.

9 Claims, 21 Drawing Sheets

(51) Int. Cl.
*B60R 25/24* (2013.01)
*E05B 47/06* (2006.01)
*E05B 81/08* (2014.01)
*E05B 83/34* (2014.01)

(52) U.S. Cl.
CPC .......... *E05B 47/0603* (2013.01); *E05B 81/08* (2013.01); *E05B 83/34* (2013.01); *E05Y 2900/534* (2013.01)

(58) Field of Classification Search
CPC ....... B60R 25/00; B60R 25/01; B60R 25/012; B60R 25/014; B60R 25/016; B60R 25/018; B60R 25/02; B60R 25/20; B60R 25/24; B60R 25/241; B60R 25/243; B60R 25/245; B60R 25/246; B60R 25/248; E05B 47/00; E05B 47/06; E05B 47/0603; E05B 81/00; E05B 81/021; E05B 81/04; E05B 81/05; E05B 81/08; E05B 83/00; E05B 83/34; E05Y 2900/00; E05Y 2900/534
USPC ......................................................... 70/162
See application file for complete search history.

(56) References Cited

U.S. PATENT DOCUMENTS

| | | | |
|---|---|---|---|
| 9,895,998 B2* | 2/2018 | Nada | ................ H01M 8/04992 |
| 2010/0156118 A1 | 6/2010 | Codeluppi et al. | |
| 2013/0158744 A1* | 6/2013 | Inoue | ................ G07C 9/00309 |
| | | | 701/2 |

FOREIGN PATENT DOCUMENTS

| | | | |
|---|---|---|---|
| JP | 2013-124487 A | | 6/2013 |
| JP | 2017-196951 A | | 2/2017 |
| JP | 2017196951 A | * | 11/2017 |

OTHER PUBLICATIONS

Japanese Office Action dated Jan. 23, 2023 for Patent Application No. 2019-141010.

* cited by examiner

FUEL TANK CAP LOCKING DEVICE

CROSS-REFERENCE TO RELATED APPLICATIONS

This application is based upon and claims the benefit of priority from prior Japanese patent application No. 2019-107019, filed on Jun. 7, 2019 and Japanese patent application No. 2019-141010, filed on Jul. 31, 2019, the entire contents of which are incorporated herein by reference.

TECHNICAL FIELD

The present invention relates to a fuel tank cap locking device for locking or unlocking the opening and closing of a cap for closing a fuel filler port leading to a fuel tank.

BACKGROUND ART

Normally, a fuel filler port is provided at the top of a fuel tank of in a large motorcycle, and there is proposed a fuel tank cap locking device including a cap that can open and close the fuel filler port by moving between a closed position where the fuel filler port is closed and an open position where the fuel filler port is opened, and a lock unit that locks or unlocks the opening and closing of the cap. For example, as a fuel tank cap locking device of related art, Patent Literature 1 discloses a device including an operation knob that is allowed to perform a swing operation around a swing shaft by an operator, an engagement unit that is movable in conjunction with a swing operation of the operation knob, and operates between an engagement position where a state in which a cap closes a fuel filler port is held, and an allowance position where the engagement is released and an opening operation of the cap is allowed, and a lock unit that locks movement of the engagement unit from the engagement position to the allowable position, or releases the lock to allow the movement of the engagement unit from the engagement position to the allowable position.

Patent Literature 1: Italian Patent No. 1393382

However, in the related art described above, the lock unit has a slider that fits with the cap in the closed position and interlocks with the engagement unit, and a solenoid that restricts movement of the slider or releases the restriction, so that the slider is visible from the outside when the cap is in the open position. As a result, there is a possibility of an erroneous operation in which the slider is accidentally slid and locked by the solenoid when the cap is in the open position.

Further, in the related art described above, the slider is provided with a fitting recess for fitting and connecting with the engagement unit when the cap is in the closed position, and therefore, when the cap is in the open position, the fitting recess faces upward, and the fitting recess may be clogged with foreign matter. In this case, even if the cap is swung to the closed position, the engagement unit cannot be fitted in the fitting recess, and the lock by the lock unit may not be normally performed.

The present invention is made in view of the above circumstances, and an object thereof is to provide a fuel tank cap locking device in which an erroneous operation of a lock unit can be prevented when a cap is in an open position, and lock can be reliably performed by the lock unit when swinging the cap to a closed position.

SUMMARY OF INVENTION

According to an aspect of the invention, there is provided a fuel tank cap locking device comprising: a cap that is configured to open and close a fuel filler port leading to a fuel tank of a vehicle by moving between a closed position where the fuel filler port is closed, and an open position where the fuel filler port is opened; an operation unit that is configured to be allowed to perform a swing operation around a swing shaft by an operator; an engagement unit that is movable in conjunction with the swing operation of the operation unit, and that is configured to operate between an engagement position where a state in which the cap closes the fuel filler port is held, and an allowable position where engagement is released and an opening operation of the cap is allowed; and a lock unit that is configured to lock movement of the engagement unit from the engagement position to the allowable position, or release lock to allow the movement of the engagement unit from the engagement position to the allowable position, wherein the lock unit includes a lock member that is movable between an interference position where the lock member interferes with an interfered portion formed at a predetermined position of the engagement unit and locks, and a non-interference position where the lock member does not interfere with the interfered portion and the lock is released when the engagement unit moves from the engagement position to the allowable position by the swing operation of the operation unit.

BRIEF DESCRIPTION OF DRAWINGS

FIGS. 2A and 2B are sectional views taken along line 11-11 in FIG. 1, in which FIG. 2A is a schematic view showing a state in which a cap is in a closed position, and FIG. 2B is a schematic view showing a state in which the cap is in an open position.

FIGS. 20A and 20B are sectional views taken along line XX-XX in FIG. 19, in which FIG. 20A is a schematic view showing a state in which a cap is in a closed position, and FIG. 20B is a schematic view showing a state in which a cap is in an open position.

FIGS. 22A and 22B are schematic views showing operation states of an operation unit of the fuel tank cap locking device, in which FIG. 22A is a schematic view showing a state before operating the operation unit (a state in which the engagement unit is in an engagement position), and FIG. 22B is a schematic view showing a state after operating the operation unit (a state in which the engagement unit is in an allowable position).

FIGS. 33A and 33B are back views showing the state in which the first engagement unit and the second engagement unit are connected with the overload preventing unit in the fuel tank cap locking device, in which FIG. 33A is a schematic view showing a state in which the first engagement unit and the second engagement unit are integrated, and FIG. 33B is a schematic view showing a state in which the first engagement unit and the second engagement unit are relatively moved.

DESCRIPTION OF EMBODIMENTS

Hereinafter, embodiments of the present invention will be described in detail with reference to the drawings.

Figure 1:
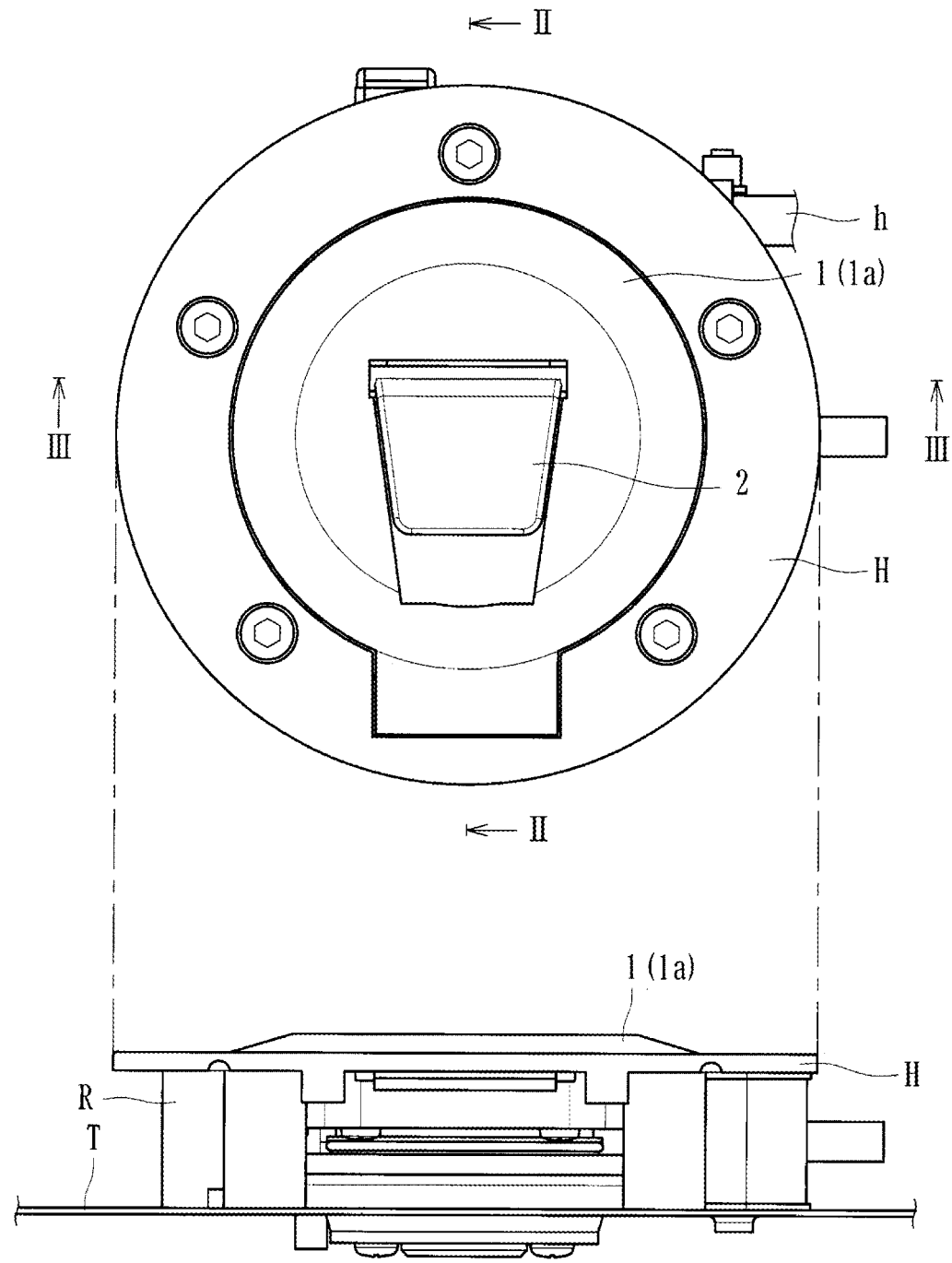
FIG. 1 is a plan view and a side view showing a fuel tank cap locking device according to a first embodiment of the present invention.
Figure 2A:
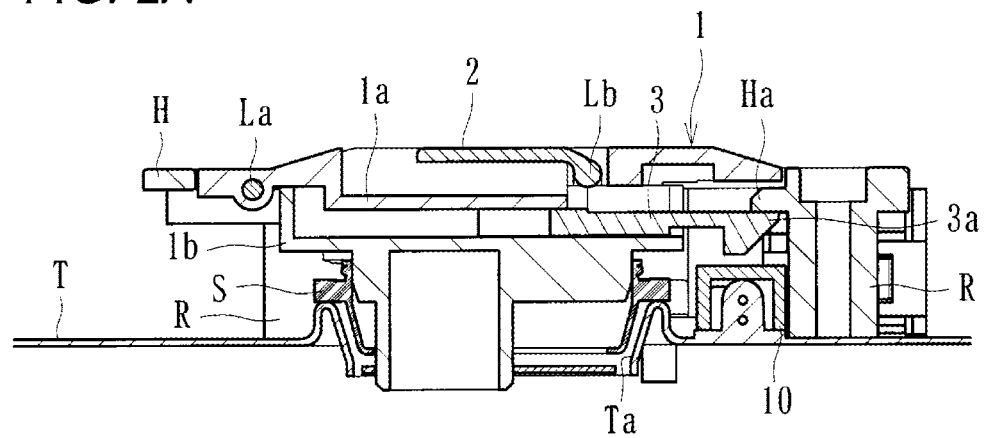
Figure 2B:
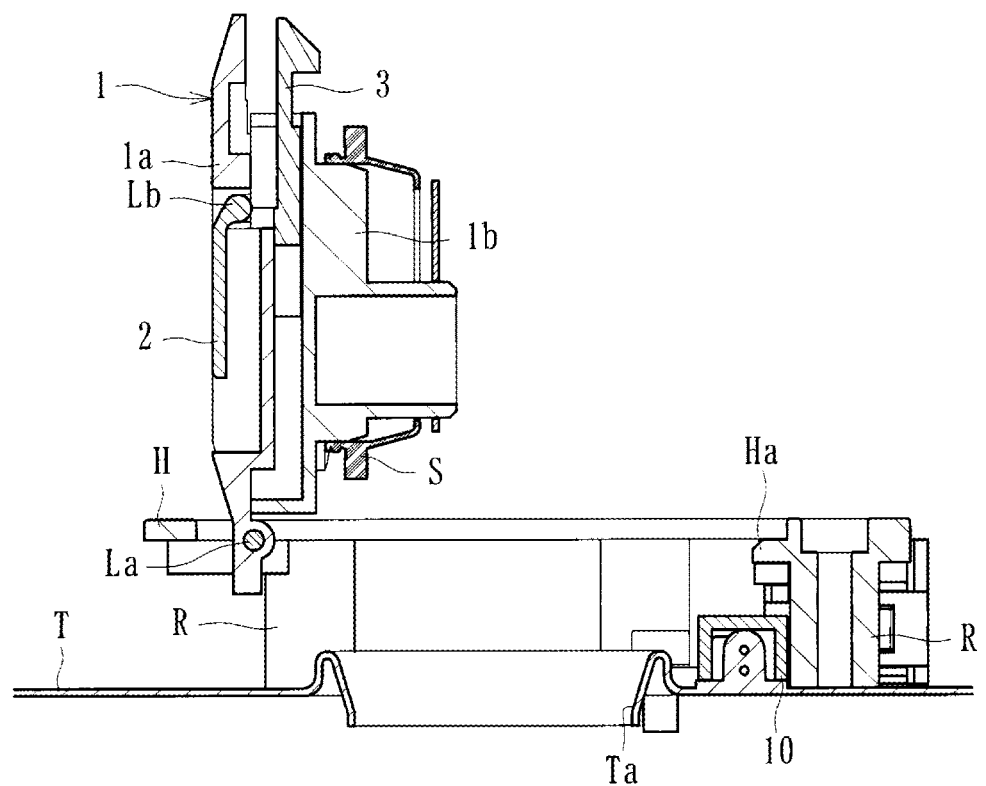
Figure 3:
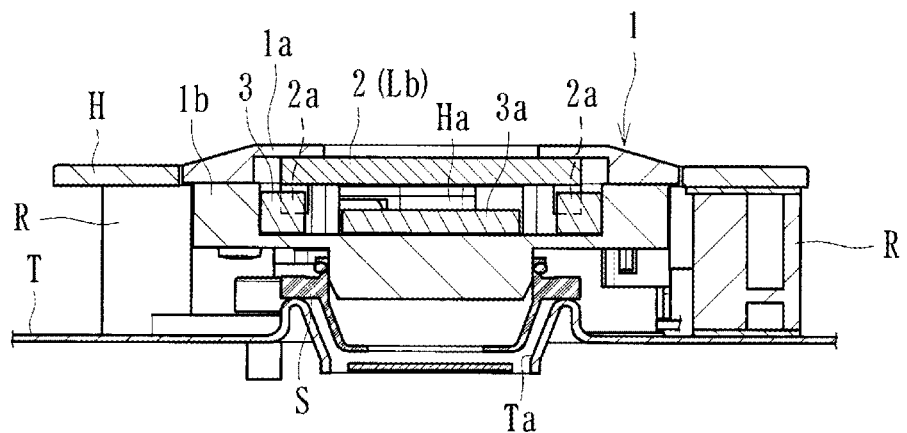
FIG. 3 is a sectional view taken along line III-III in FIG. 1.

A fuel tank cap locking device according to a first embodiment is a device for locking or unlocking the opening and closing of a cap for closing a fuel filler port leading to a fuel tank in a large motorcycle. As shown in FIGS. 1 to 3, the fuel tank cap locking device includes a cap 1, an operation knob 2 (operation unit), an engagement unit 3, a solenoid 5 as a lock unit, a slider 6, and a detection switch 8. The above components are housed in a main body R fixed to a fuel tank T having a fuel filler port Ta. As shown in FIGS. 1 to 3, an annular cover portion H is fixed to an upper portion of the main body R by a plurality of bolts.

The cap 1 is capable of opening and closing the fuel filler port Ta leading to the fuel tank of a vehicle by moving between a closed position where the fuel filler port Ta is closed (see FIG. 2A) and an open position where the fuel filler port Ta is opened (see FIG. 2B), and includes an upper cap portion 1a and a lower cap portion 1b. In the present embodiment, when an operator such as a driver picks up the operation knob 2 by hand and pulls it up, the cap 1 swings around a swing shaft La to move from the closed position to the open position, so that the fuel filler port Ta can be exposed to the outside.

Figure 8:
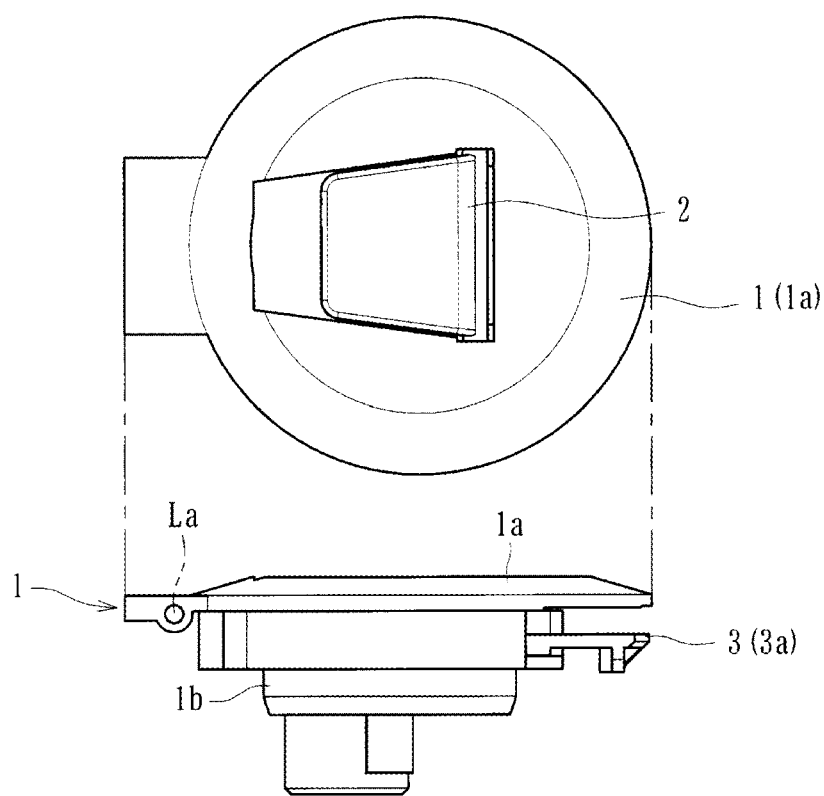
FIG. 8 is a plan view and a side view showing the cap of the fuel tank cap locking device.

As shown in FIG. 8, the swing shaft La around which the cap 1 swings between the closed position and the open position is formed at a predetermined position of the upper cap portion 1a. Further, the upper cap portion 1a holds the operation knob 2 (operation unit) at an upper portion thereof such that the operation knob 2 can be swung. The lower cap portion 1b is attached with a seal material S that seals the fuel filler port Ta when the cap 1 is in the closed position, and houses the engagement unit 3 with the engagement unit 3 being able to move between an engagement position and an allowable position as shown in FIGS. 4 to 6.

Figure 9:
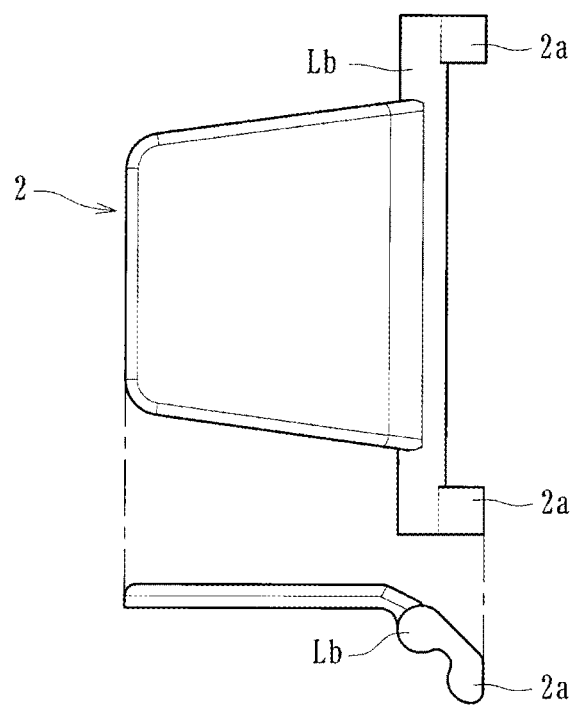
FIG. 9 is a plan view and a side view showing the operation unit of the fuel tank cap locking device.

The operation knob 2 (operation unit) has a swing shaft Lb formed integrally therewith as shown in FIG. 9, has protruding portions 2a formed at both end portions of the swing shaft Lb respectively, and is attached to a recess formed on an upper surface of the cap 1 (upper cap portion 1a). When the operator pulls up the operation knob 2 to operate it, the operation knob 2 can be operated to swing around the swing shaft Lb.

Figure 4:
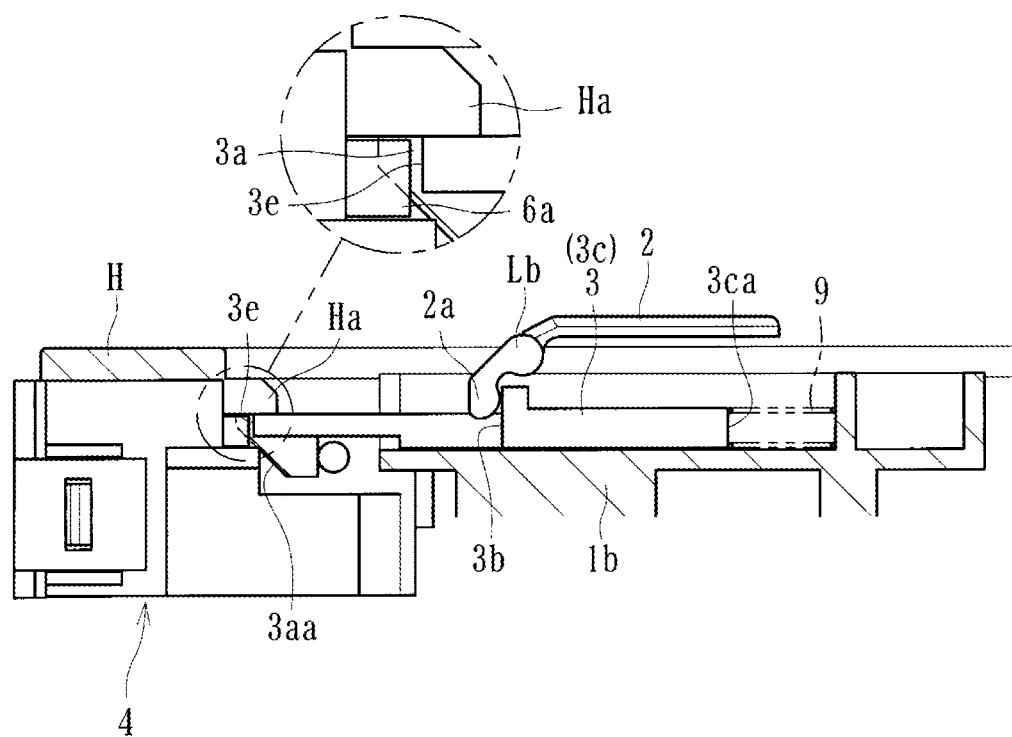
FIG. 4 is a schematic view showing a state before operating an operation unit in the fuel tank cap locking device (a state in which the engagement unit is in an engagement position).
Figure 5:
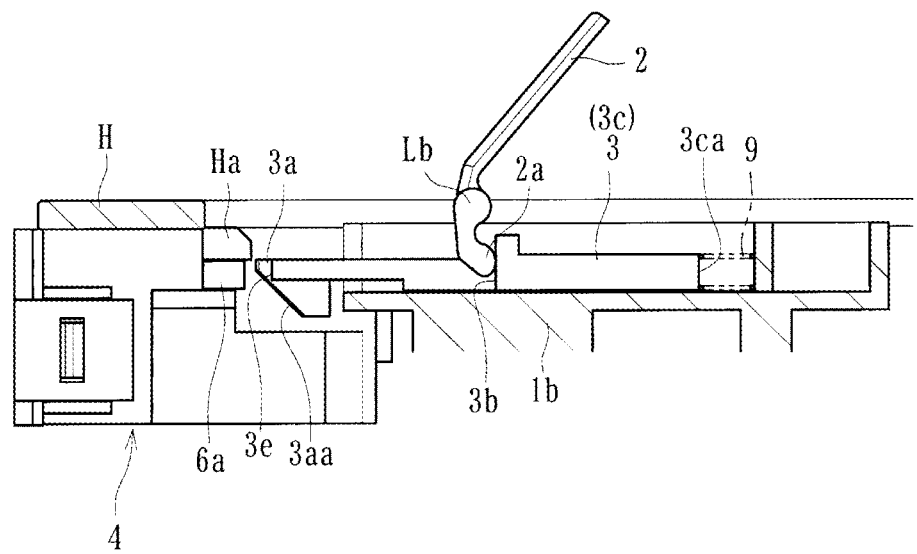
FIG. 5 is a schematic view showing a state after operating the operation unit in the fuel tank cap locking device (a state in which the engagement unit is in an allowable position).
Figure 6:
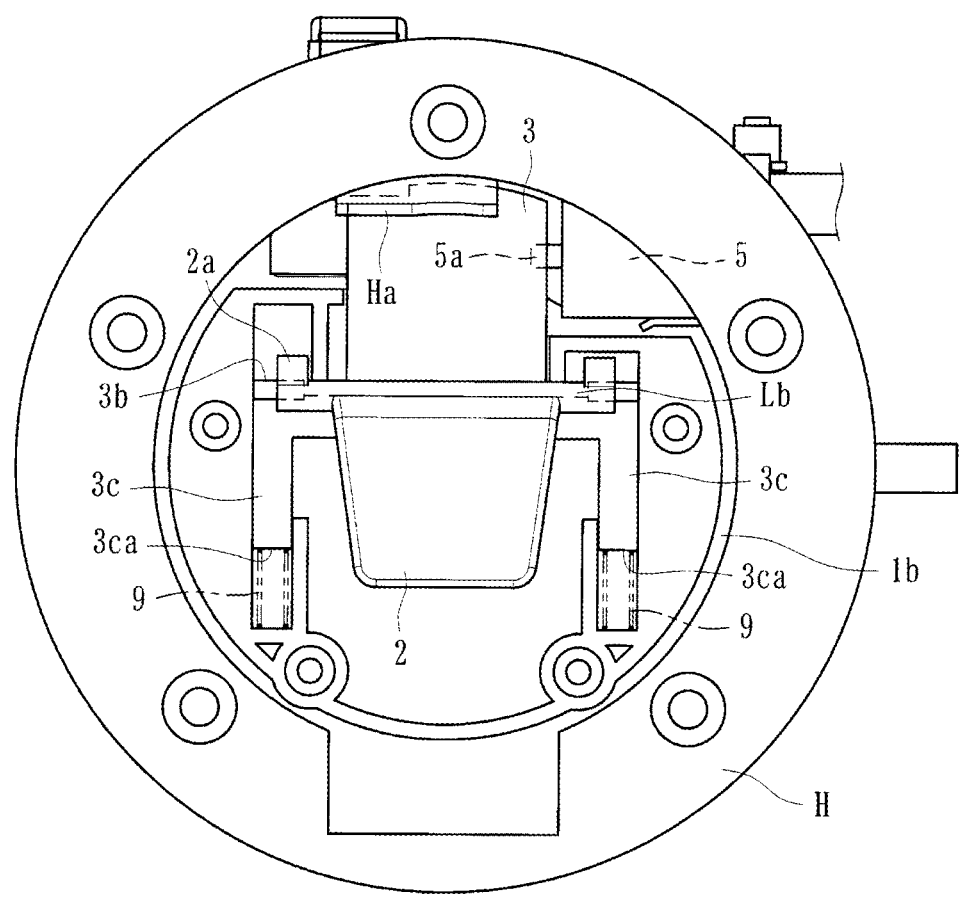
FIG. 6 is a plan view showing a state in which the cap is removed from the fuel tank cap locking device as viewed from above.

The engagement unit 3 is movable in conjunction with the operation of the operation knob 2, and operates between the engagement position where a state in which the cap 1 closes the fuel filler port Ta is held (see FIG. 4), and the allowable position where the engagement is released and an opening operation of the cap 1 is allowed (see FIG. 5). More specifically, the engagement unit 3 according to the present embodiment is slidable in a substantially linear shape in a working space (see FIG. 6) inside the lower cap portion 1b, and is configured such that when the engagement unit 3 is in the engagement position as shown in FIG. 4, an engagement portion 3a at a tip end is engaged with an engaged portion Ha formed on the cover portion H to restrict movement of the cap 1 from the closed position to the open position, and when operation knob 2 is operated and the engagement unit 3 is in the allowable position as shown in FIG. 5, the engagement portion 3a is separated from the engaged portion Ha to be disengaged, and the movement of the cap 1 from the closed position to the open position is allowed.

Figure 10:
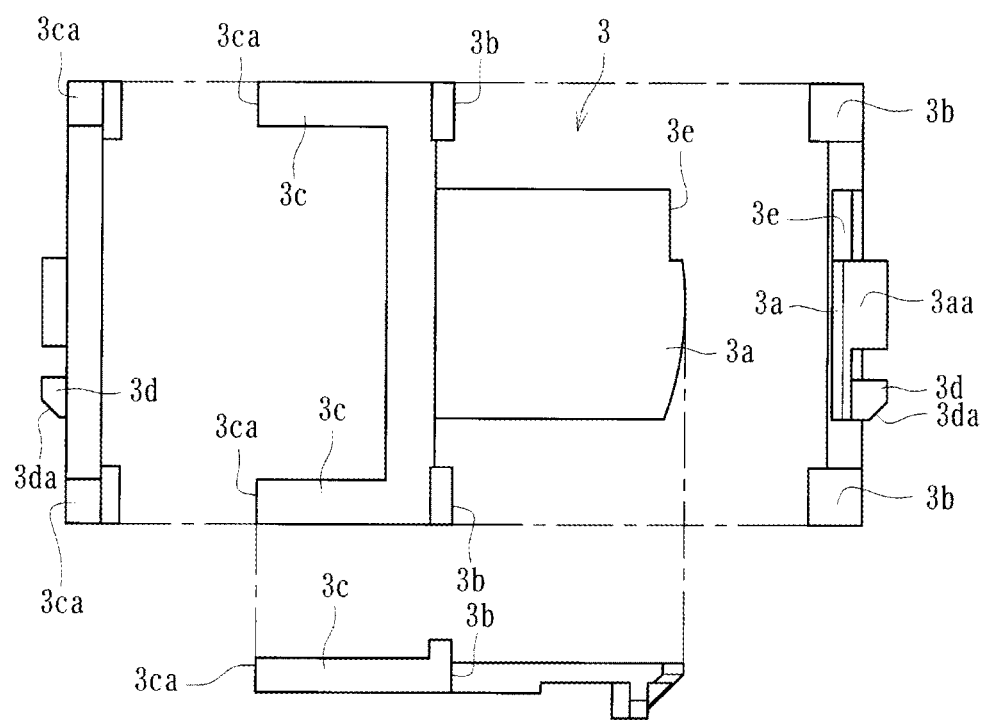
FIG. 10 is a four-side view showing the engagement unit of the fuel tank cap locking device.

Further, the engagement unit 3 is biased from the allowable position toward the engagement position by a biasing force of a coil spring 9 as shown in FIGS. 4 and 5, and has a tapered surface 3aa formed on a back surface side of the engagement portion 3a as shown in FIG. 10. When the cap 1 is swung from the open position to the closed position, the tapered surface 3aa interferes with the engaged portion Ha of the cover portion H, and the engagement unit 3 slightly moves toward the allowable position against the biasing force of the coil spring 9. In this way, when the engagement unit 3 moves to reach a position where the tapered surface 3aa does not interfere with the engaged portion Ha the cap 1 swings to the closed position and the engagement unit 3 moves to the engagement position by the biasing force of the coil spring 9, so that the engagement portion 3a engages with the engaged portion Ha.

Figure 11:
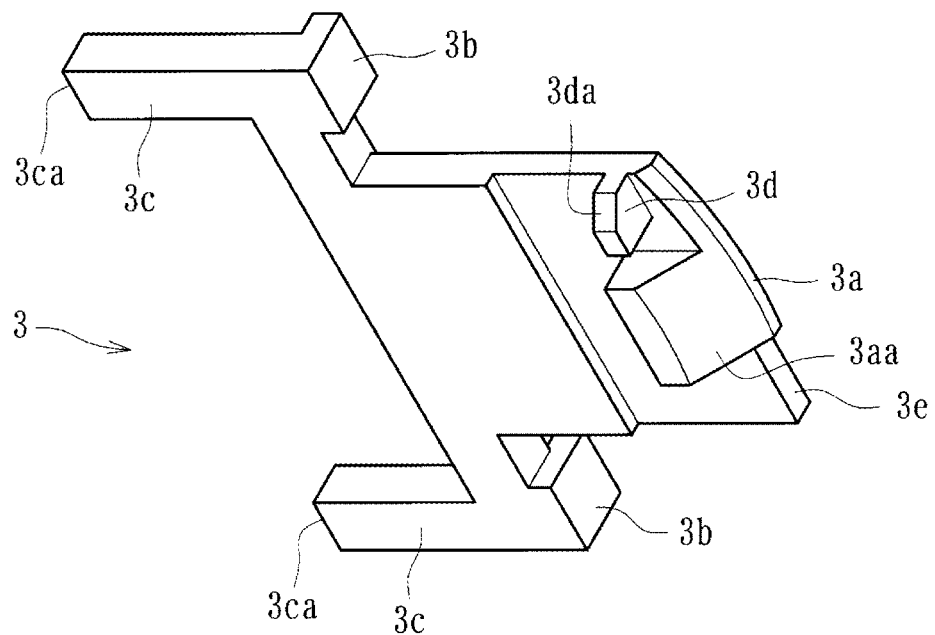
FIG. 11 is a perspective view showing the engagement unit of the fuel tank cap locking device.
Figure 12:
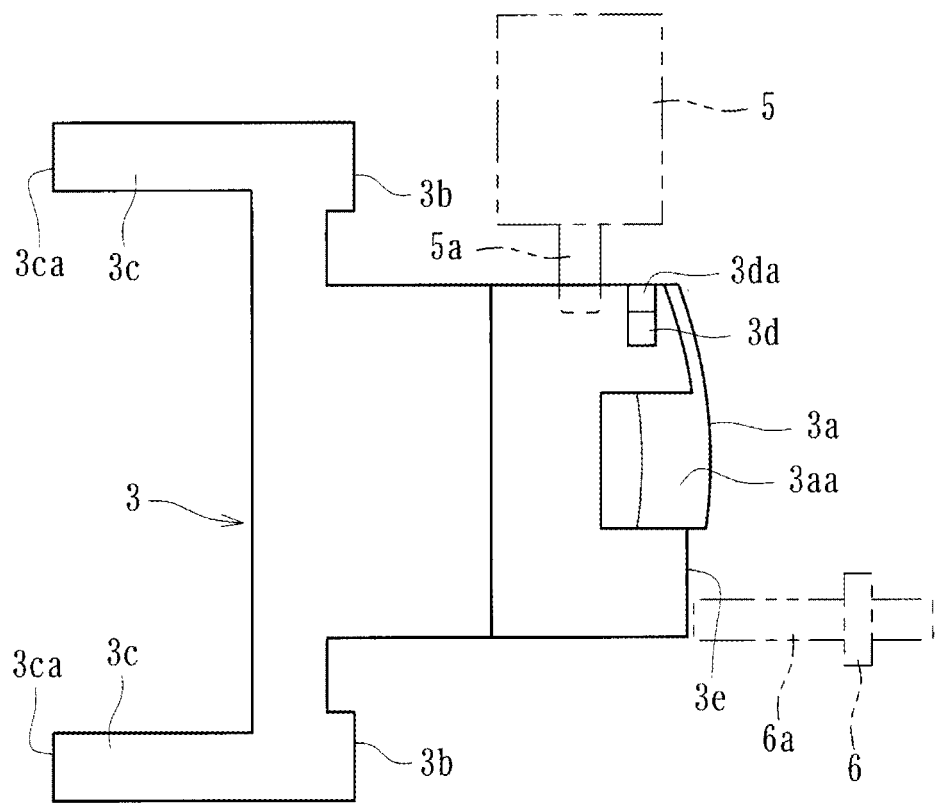
FIG. 12 is a back view showing the engagement unit.
Figure 13:
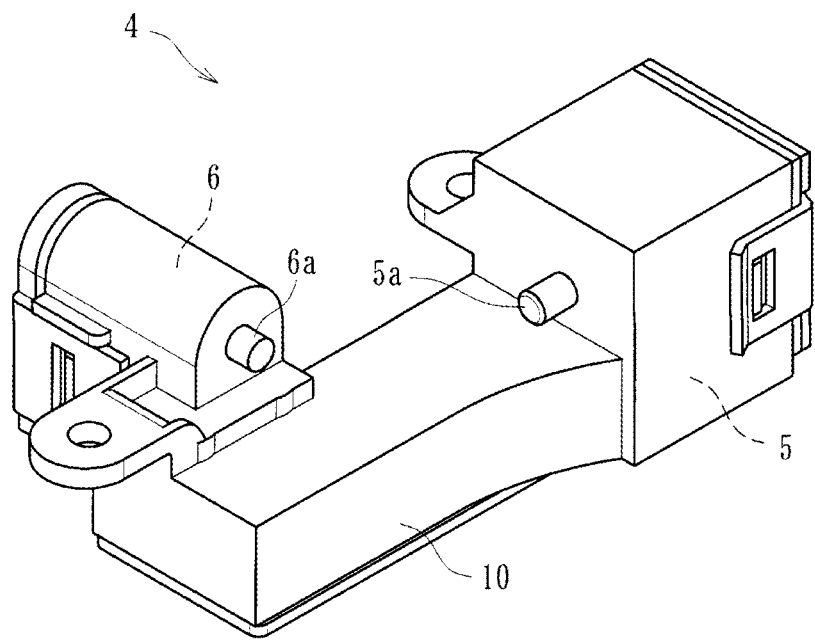
FIG. 13 is a perspective view showing a unit having the solenoid and the slider in the fuel tank cap locking device.
Figure 14:
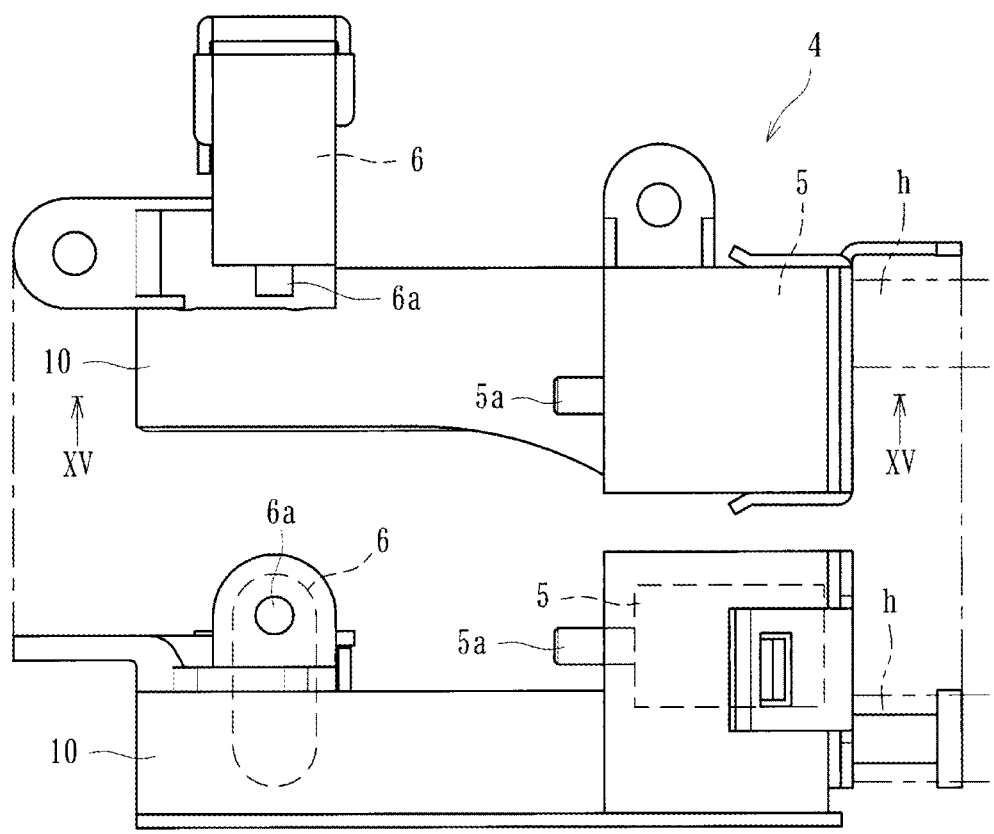
FIG. 14 is a plan view and a side view showing the unit.
Figure 15:
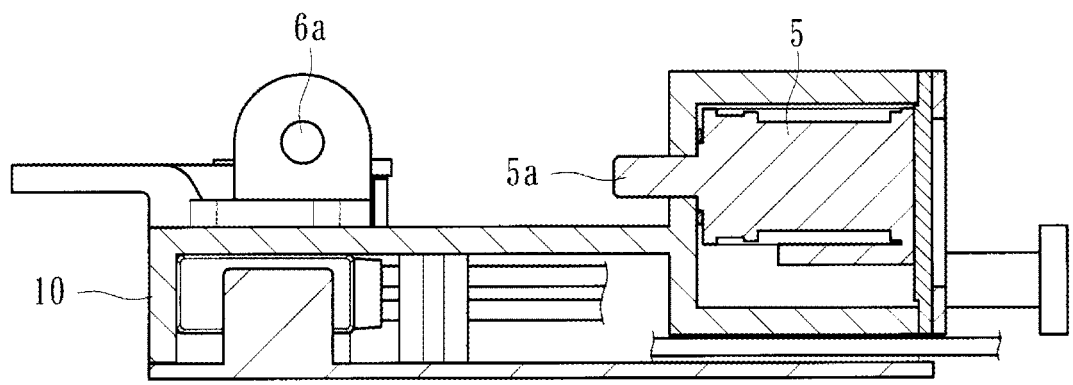
FIG. 15 is a sectional view taken along line XV-XV in FIG. 14.

Further, as shown in FIGS. 10 to 12, the engagement unit 3 according to the present embodiment includes, in addition to the engagement portion 3a and the tapered surface 3aa, stepped portions 3b, extended portions 3c, an interfered portion 3d formed on a back surface side of the engagement unit 3, and a contact portion 3e formed at a tip end portion of the engagement unit 3. The extended portions 3c are formed of a pair of left and right portions integrally extended from both end portions of the engagement portion 3a, and end portions 3ca can be brought into contact with one end of the coil spring 9 described above. Further, the stepped portions 3b located between the engagement portion 3a and the extended portions 3c are brought into contact with the protruding portions 2a of the operation knob 2 as shown in FIGS. 4 and 5, and when the operation knob 2 swings around the swing shaft Lb, the stepped portions 3b are pressed by the protruding portions 2a such that the engagement unit 3 is moved from the engagement position to the allowable position.

Further, in the present embodiment, the lock unit is provided to lock movement of the engagement unit 3 from the engagement position to the allowable position, or to release the lock to allow the movement of the engagement unit 3 from the engagement position to the allowable position. Specifically, the lock unit according to the present embodiment is formed of the solenoid 5 with a plunger 5a whose position is changeable by energization, and the plunger 5a configures a lock member that is movable between an interference position where the plunger 5a interferes with the interfered portion 3d formed at a predetermined position of the engagement unit 3 and locks, and a non-interference position where the plunger 5a does not interfere with the interfered portion 3d and the lock is released when the engagement unit 3 moves from the engagement position to the allowable position by the swing operation of the operation knob 2.

The position of the plunger 5a can be changed between a protruding state and a contracted state by energization, and is set to the interference position under the protruding state and to the non-interference position under the contracted state, and the plunger 5a is constantly biased in a direction from the contracted state (non-interference position) to the protruding state (interference position) by a spring (not shown) formed inside the solenoid 5. That is, when the plunger 5a is not energized, the plunger 5a is in the protruding state (interference position) due to the biasing force of the spring provided therein such that the engagement unit 3 is locked, and when the plunger 5a is energized, the plunger 5a is in the contracted state (non-interference position) against the biasing force of the spring therein such that the engagement unit 3 is unlocked.

On the other hand, as shown in FIGS. 10 to 12, the interfered portion 3d according to the present embodiment is a portion integrally formed on the back surface side of the engagement unit 3 and protruding downward. When there is an attempt to move the engagement unit 3 from the engagement position to the allowable position while the cap 1 is in the closed position, the plunger 5a in the interference position interferes with a side surface of the interfered portion 3d to restrict the movement of the engagement unit 3 toward the allowable position and lock the engagement unit 3; when the plunger 5a is moved from the interference position to the non-interference position by energizing the solenoid 5, the lock is released, so that the engagement unit 3 is allowed to move toward the allowable position, the lock is released, and the cap 1 can be swung to the open position.

Further, a tapered surface 3da is formed on a protruding end of the interfered portion 3d so as to come into contact with the plunger 5a (lock member) such that the plunger 5a is moved from the interference position to the non-interference position when the cap 1 moves from the open position to the closed position. That is, when trying to swing the cap 1 from the open position to the closed position, the tapered surface 3da of the interfered portion 3d of the engagement unit 3 is set to come into contact with the plunger 5a, and in a process of swinging the cap 1 to the closed position, the tapered surface 3da can press the plunger 5a to move it from the interference position to the non-interference position.

In this way, when the plunger 5a moves to reach a position (non-interference position) where the plunger 5a does not interfere with the interfered portion 3d, the cap 1 can be swung to the closed position, and then the plunger 5a is returned to the interference position by the spring provided therein. Therefore, when the cap 1 is swung from the open position to the closed position, a swinging force can naturally move the plunger 5a from the interference position to the non-interference position so that the operability can be improved.

As shown in FIGS. 13 to 17, the solenoid 5 according to the present embodiment is housed in the unit 4 fixed at a predetermined position in the main body R, and the plunger 5a is in a state of protruding to the outside of the unit 4. The unit 4 includes an attachment case 10 to which the slider 6 and the detection switch 8 are attached, and the solenoid 5, the slider 6 and the detection switch 8 are integrated parts.

Further, in the present embodiment, the slider 6 interlocking with the engagement unit 3, and the detection switch 8 capable of detecting the movement of the slider 6 are provided, and the lock can be released by the solenoid 5 (lock unit) on condition that the detection switch 8 detects the movement of the slider 6. Specifically, as shown in FIGS. 13 to 17, the slider 6 and the detection switch 8 are attached to the attachment case 10 that constitutes the unit 4, and a protruding portion 6a of the slider 6 is in a state of protruding to the outside of the unit 4. Reference numeral f in the figure indicates a seal material for waterproofing.

Figure 16:
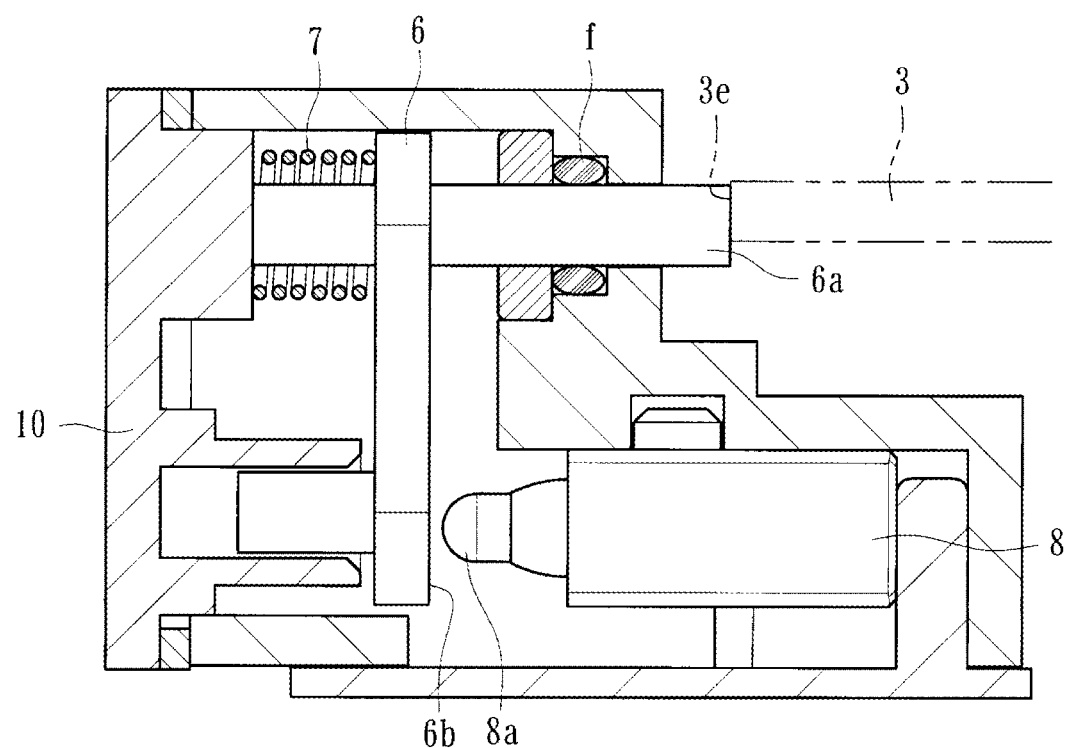
FIG. 16 is a schematic view showing a positional relationship between the slider and a detection switch (off state) in the fuel tank cap locking device.
Figure 17:
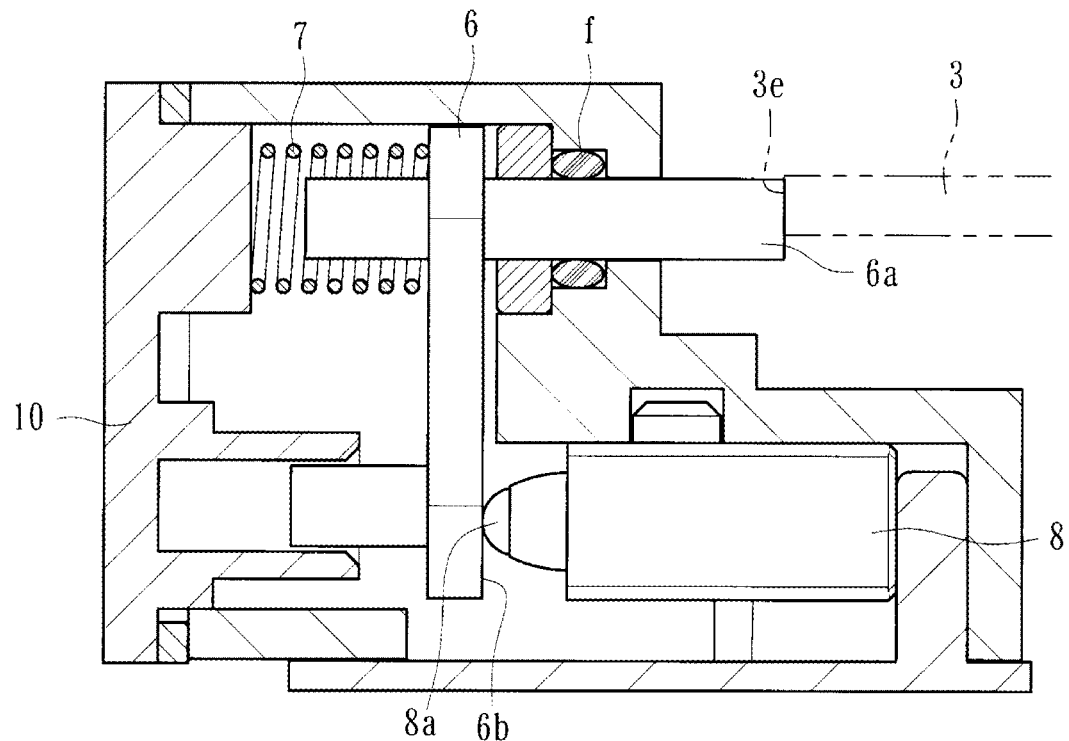
FIG. 17 is a schematic view showing a positional relationship between the slider and the detection switch (on state) in the fuel tank cap locking device.

The slider 6 is biased to the right side in FIGS. 16 and 17 by the coil spring 7 attached to the attachment case 10, and is assembled with a protruding end of the protruding portion 6a being in contact with the contact portion 3e of the engagement unit 3. The slider 6 has a pressing surface 6b capable of pressing an operation portion 8a of the detection switch 8 at a position different from the protruding portion 6a, and is configured such that the pressing surface 6b presses the operation portion 8a to electrically turn on the detection switch 8 (see FIG. 17), or the pressing surface 6b is separated from the operation portion 8a to electrically turn off the detection switch 8 (see FIG. 16), depending on the movement of the slider 6.

When the engagement unit 3 is in the engagement position, the slider 6 is in a state in which the pressing surface 6b is separated from the operation portion 8a, and the detection switch 8 is in an electrically off state as shown in FIG. 16. When the operation knob 2 is started and the engagement unit 3 starts to move from the engagement position toward the allowable position, the slider 6 moves in the same direction following the engagement unit 3 by the biasing force of the coil spring 7, the pressing surface 6b presses the operation portion 8a, and the detection switch 8 is electrically turned on. In this way, when the detection switch 8 detects the movement of the slider 6 and is electrically turned on, the solenoid 5 is energized and the lock is released. Therefore, by continuously operating the operation knob 2, the engagement unit 3 is moved to the allowable position.

Figure 7:
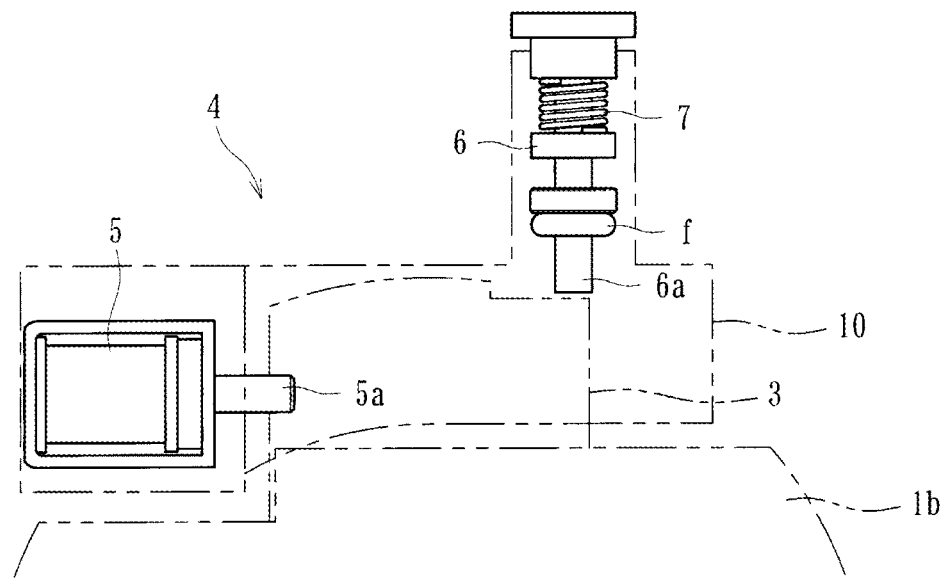
FIG. 7 is a schematic view showing a positional relationship between a solenoid and a slider with respect to the engagement unit in the fuel tank cap locking device.

However, in the present embodiment, as shown in FIG. 7, in the unit 4, the plunger 5a of the solenoid 5 and the protruding portion 6a of the slider 6 protrude in respective predetermined directions, and are configured such that the plunger 5a interferes with the interfered portion 3d of the engagement unit 3, and the protruding portion 6a is in contact with the contact portion 3e. As a result, the relative positional relationship between the interference position of the plunger 5a and a contact position of the engagement unit 3 can be accurately maintained.

Figure 18:
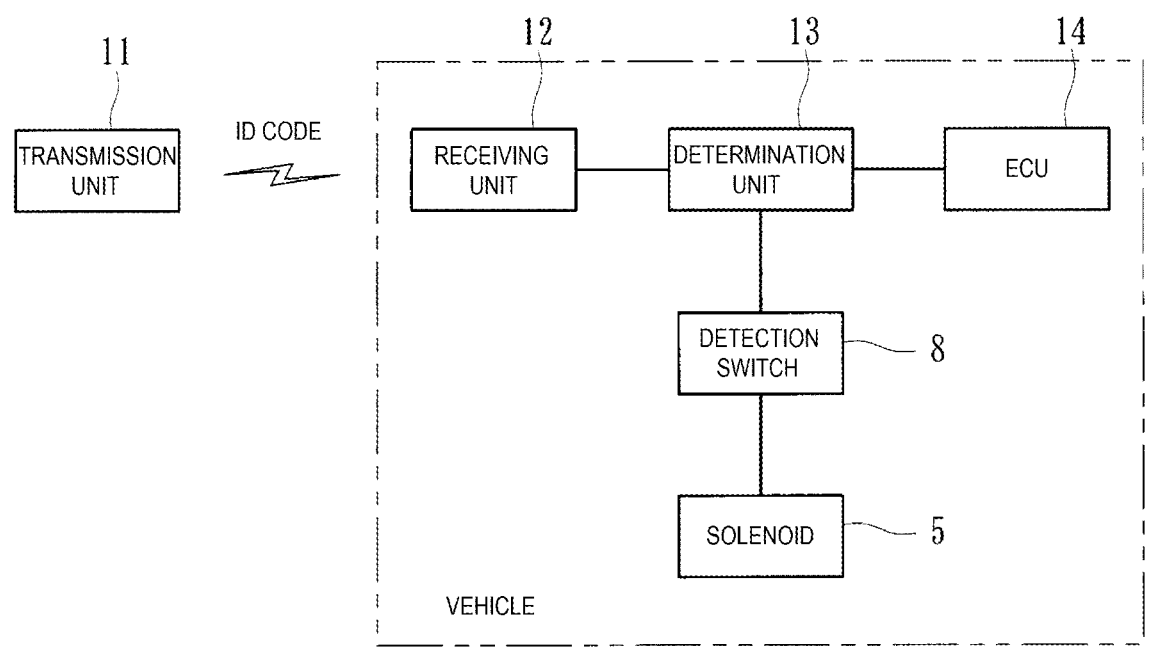
FIG. 18 is a block diagram showing an overall configuration of the fuel tank cap locking device.
Figure 19:
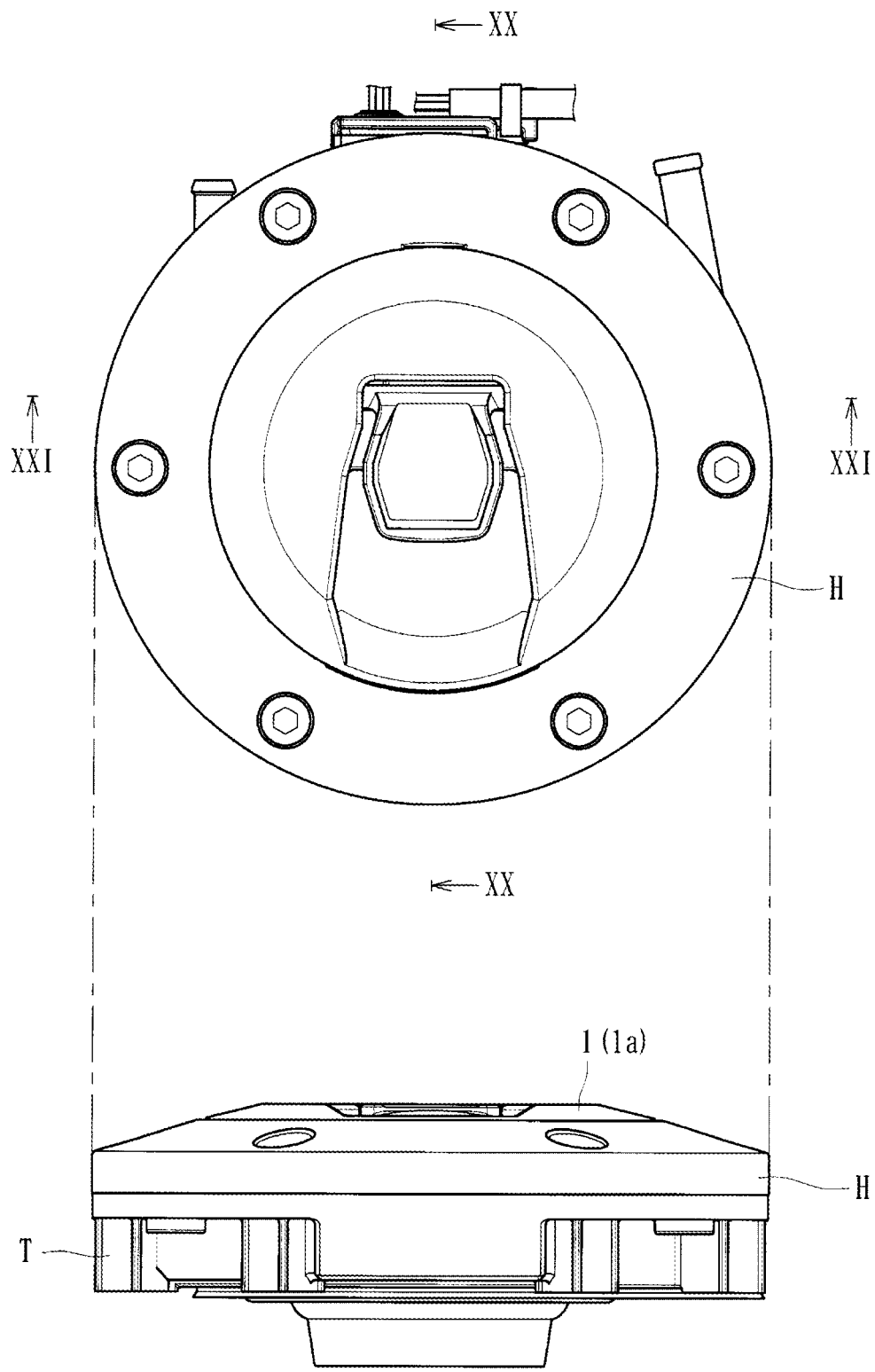
FIG. 19 is a plan view and a side view showing a fuel tank cap locking device according to a second embodiment of the present invention.
Figure 20A:
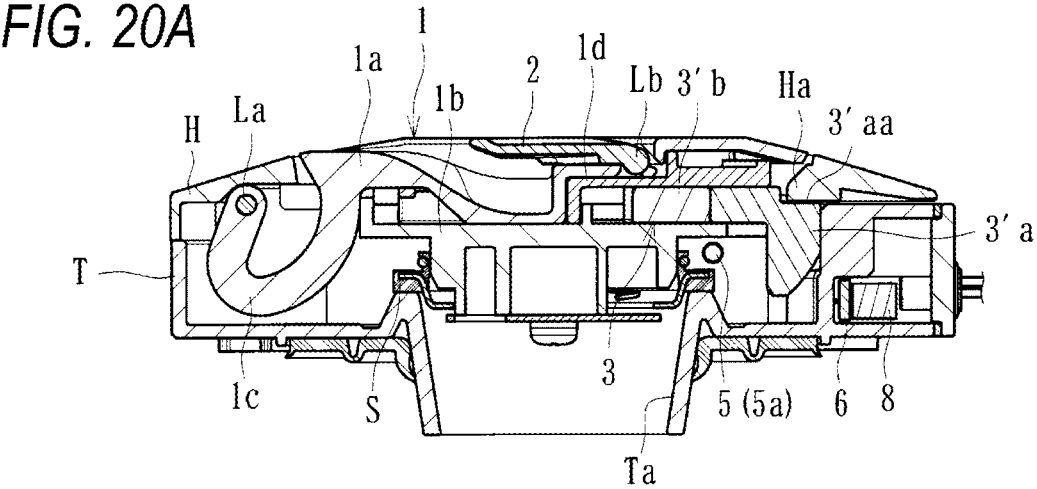
Figure 20B:
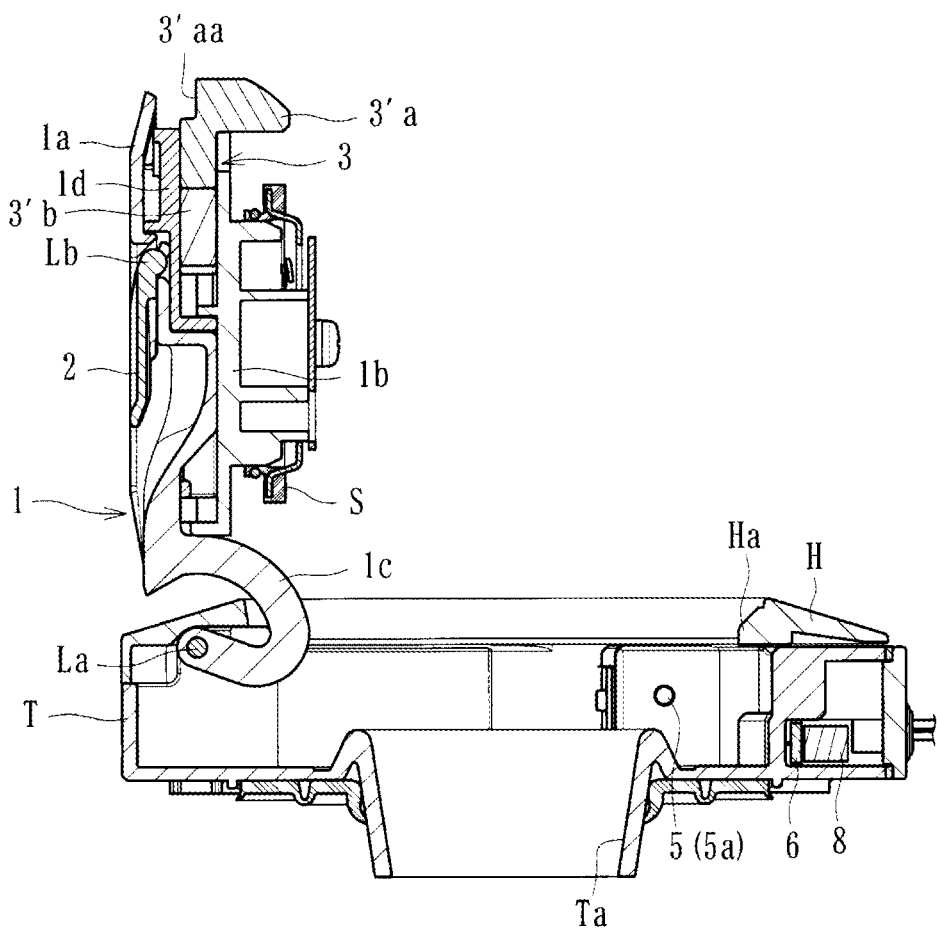
Figure 21:
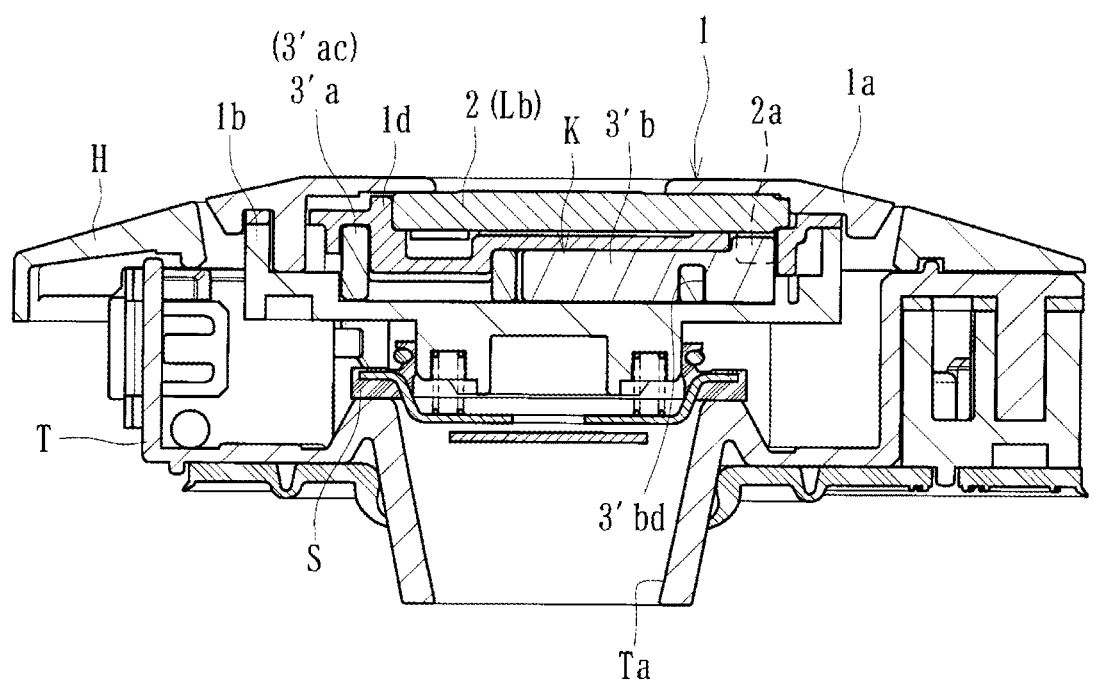
FIG. 21 is a sectional view taken along line XXI-XXI in FIG. 19.

In addition, as shown in FIG. 18, a vehicle applied to the present embodiment has a transmission unit 11 that can be carried by a driver and is configured to transmit a vehicle-specific ID code by radio waves, a receiving unit 12 that is arranged on a vehicle side and capable of receiving the ID code from the transmission unit 11, and a determination unit 13 that determines whether the ID code received by the receiving unit 12 is authorized for the vehicle; and transmits a control signal to an ECU 14 to permit engine start on condition that the determination unit 13 determines that the received ID code is authorized.

Further, the determination unit 13 according to the present embodiment is electrically connected to the detection switch 8, and on condition that the determination unit 13 determines that a received ID code is authorized and the movement of the engagement unit 3 is detected by the detection switch 8, the plunger 5a of the solenoid 5 is set in the contracted state to the non-interference position, so that the lock is released. That is, in a case where the determination unit 13 determines that a received ID code is authorized, and the start of movement of the engagement unit 3 is detected by the detection switch 8, the plunger 5a of the solenoid 5 is moved from the protruding state (interference position) to the contracted state (non-interference position) to release the lock of the lock unit, and the movement of the engagement unit 3 from the engagement position to the allowable position is allowed; while in a case where the determination unit 13 determines that a received ID code is not authorized, even if the start of movement of the engagement unit 3 is detected by the detection switch 8, the plunger 5a of the solenoid 5 is kept in the protruding state (interference position) so that the lock release operation is not performed by the lock unit.

According to the present embodiment, the lock unit (solenoid 5) includes the lock member (plunger 5a) that is movable between the interference position where the plunger 5a interferes with the interfered portion 3d formed at the predetermined position of the engagement unit 3 and locks, and the non-interference position where the plunger 5a does not interfere with the interfered portion 3d and the lock is released when the engagement unit 3 moves from the engagement position to the allowable position by the swing operation of the operation knob 2. Therefore, when the cap 1 is in the open position, erroneous operation of the lock unit can be prevented, and when swinging the cap 1 to the closed position, the lock can be reliably performed by the lock unit.

That is, according to the present embodiment, the engagement unit 3 is directly locked or unlocked as compared with one in related art that locks or unlocks a slider interlocking with the engagement unit 3, so that erroneous operation of the lock unit can be prevented when the cap 1 is in the open position. Further, there is no fitting recess for fitting in the engagement unit 3 as in related an, so that there is no problem like foreign matter being clogged in the fitting recess, and a problem generated when the cap 1 swings to the closed position can be avoided.

When the cap 1 moves from the open position to the closed position, the lock member (plunger 5a) according to the present embodiment is pressed by the interfered portion 3d and moved from the interference position to the non-interference position, so that the cap 1 can swing to the closed position without being interfered by the lock member, and the engagement unit 3 in the engagement position can be reliably locked by the lock unit.

Further, the interfered portion 3d according to the present embodiment is formed with the taper surface 3da that comes into contact with the lock member (plunger 5a) such that the plunger 5a is moved from the interference position to the non-interference position when the cap 1 moves from the open position to the closed position, so that the lock member can be smoothly moved from the interference position to the non-interference position. In particular, the lock unit according to the present embodiment is formed of the solenoid 5 with the plunger 5a whose position is changeable by energization, and the lock member is formed of the plunger 5a, so that the responsiveness is high and the engagement unit 3 can be locked or unlocked reliably.

Further, the slider 6 interlocking with the engagement unit 3, and the detection switch 8 capable of detecting the movement of the slider 6 are provided, and the lock can be released by the lock unit on condition that the detection switch 8 detects the movement of the slider 6, so that the movement of the engagement unit 3 can be detected by the detection switch 8 via the slider 6. Therefore, the arrangement position and the arrangement direction (the direction in which the operation portion 8a is pressed) of the detection switch 8 can be optionally set, and the degree of freedom of layout can be improved.

In addition, the transmission unit 11 that can be carried by a driver and is configured to transmit a vehicle-specific ID code, the receiving unit 12 that is arranged on a vehicle side and capable of receiving the ID code from the transmission unit, and the determination unit 13 that determines whether the ID code received by the receiving unit 12 is authorized for the vehicle are provided, and the lock can be released by the locking unit only when the determination unit 13 determines that a received ID code is authorized. Therefore, it is possible to prevent a third party from illegally unlocking by the lock unit, so as to improve the prevention of crime.

In particular, the lock is released by the lock unit on condition that the determination unit 13 determines that a received ID code is authorized and the movement of the engagement unit 3 is detected, so that the lock can be released in the process of operating the operation knob 2, and the operability can be improved as compared with, for example, a case where the lock is released by a separate operation unit (access switch or the like) attached to the vehicle side.

Next, a fuel tank cap locking device according to a second embodiment of the present invention will be described.

As in the first embodiment, the fuel tank cap locking device according to the second embodiment is a device for locking or unlocking the opening and closing of a cap for closing a fuel filler port leading to a fuel tank in a large motorcycle. As shown in FIGS. 19 to 22B, the fuel tank cap locking device includes the cap 1, the operation knob 2 (operation unit), an engagement unit 3', the solenoid 5 as the lock unit, the slider 6, the detection switch 8, and an overload preventing unit 1S. In the present embodiment, the above components are housed in a main body T having the fuel filler port Ta. As shown in FIGS. 19 to 22B, the annular cover portion His fixed to an upper portion of the main body T by a plurality of bolts.

The cap 1 is capable of opening and closing the fuel filler port Ta leading to the fuel tank of a vehicle by moving between the closed position where the fuel filler port Ta is closed (see FIG. 20A) and the open position where the fuel filler port Ta is opened (see FIG. 20B), and includes the upper cap portion 1a and the lower cap portion 1b. In the present embodiment, when an operator such as a driver picks up the operation knob 2 by hand and pulls it up, the cap 1 swings around the swing shaft La to move from the closed position to the open position, so that the fuel filler port Ta can be exposed to the outside.

Figure 26:
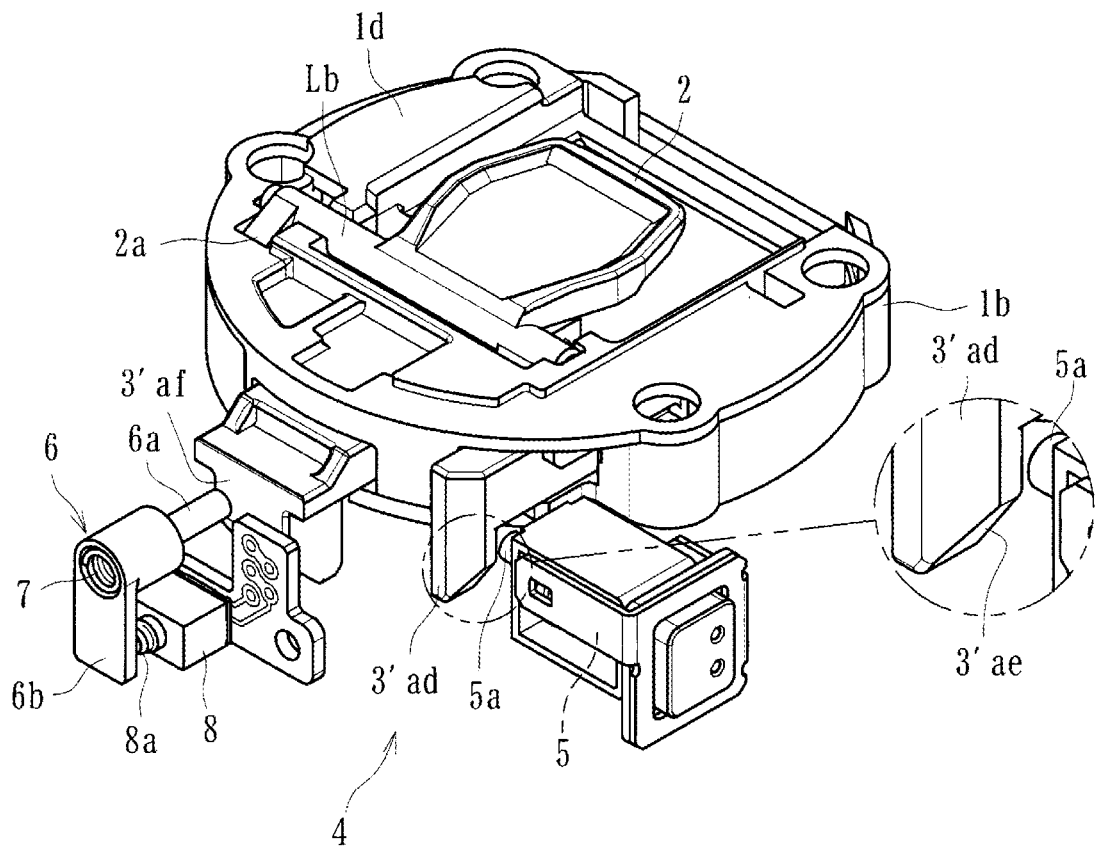
FIG. 26 is a perspective view showing a state in which a lock unit locks the engagement unit in the fuel tank cap locking device.
Figure 27:
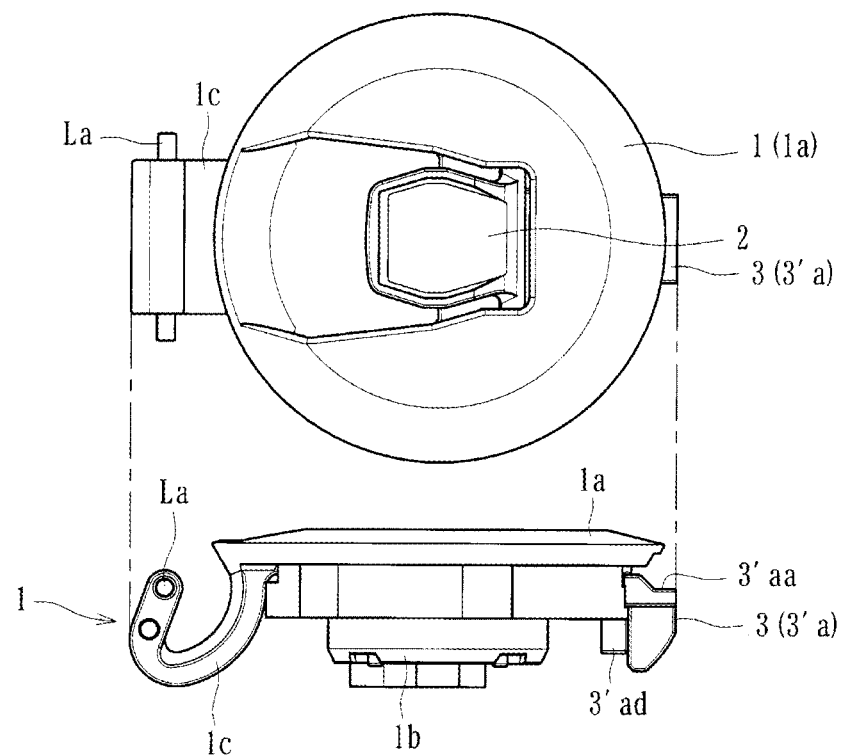
FIG. 27 is a plan view and a side view showing the cap of the fuel tank cap locking device.

As shown in FIG. 27, a curved arm portion 1c is formed in the upper cap portion 1a, and the swing shaft La around which the cap 1 swings between the closed position and the open position is formed at a predetermined position of the arm portion 1c. Further, the upper cap portion 1a holds the operation knob 2 (operation unit) at an upper portion thereof such that the operation knob 2 can be swung. The lower cap portion 1b is attached with a seal material S that seals the fuel filler port Ta when the cap 1 is in the closed position, and houses the engagement unit 3' with the engagement unit 3' being able to move between an engagement position and an allowable position as shown in FIGS. 20A to 22B. Reference numeral 1d in FIG. 26 indicates a lid member that closes an upper portion of the lower cap portion 1b.

Figure 28:
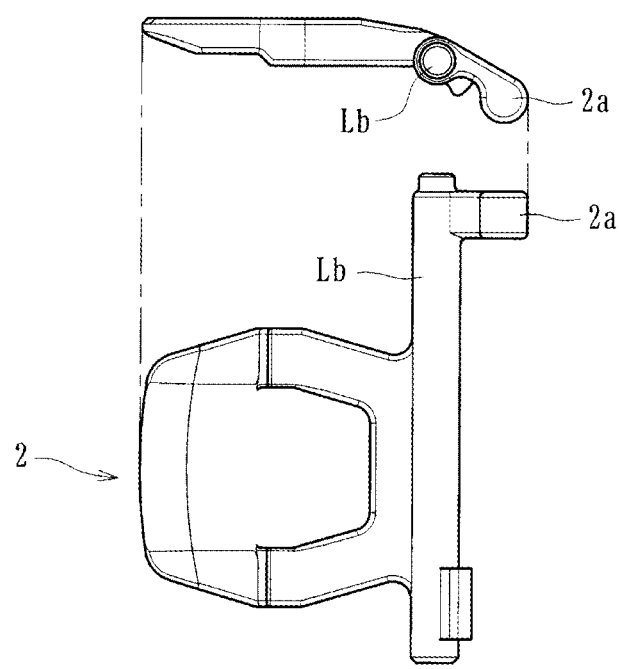
FIG. 28 is a plan view and a side view showing the operation unit of the fuel tank cap locking device.

The operation knob 2 (operation unit) has a swing shaft Lb formed integrally therewith as shown in FIG. 28, has a protruding portion 2a formed at one end portion of the swing shaft Lb, and is attached to a recess formed on an upper surface of the cap 1 (upper cap portion 1a). When the operator pulls up the operation knob 2 to operate it, the operation knob 2 can be operated to swing around the swing shaft Lb.

Figure 22A:
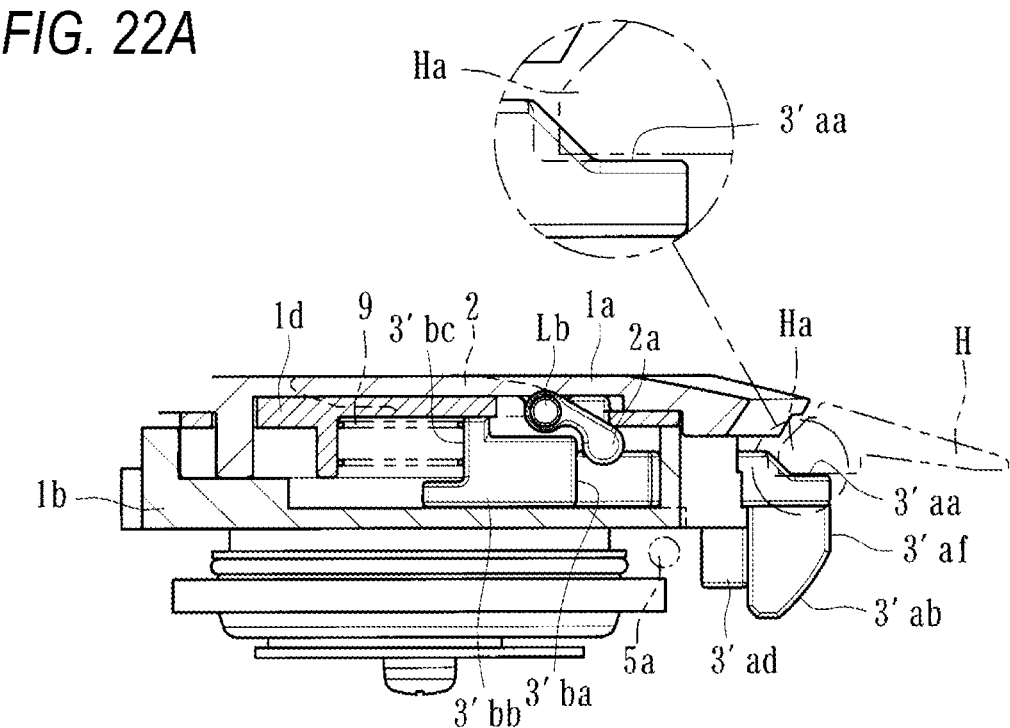
Figure 22B:
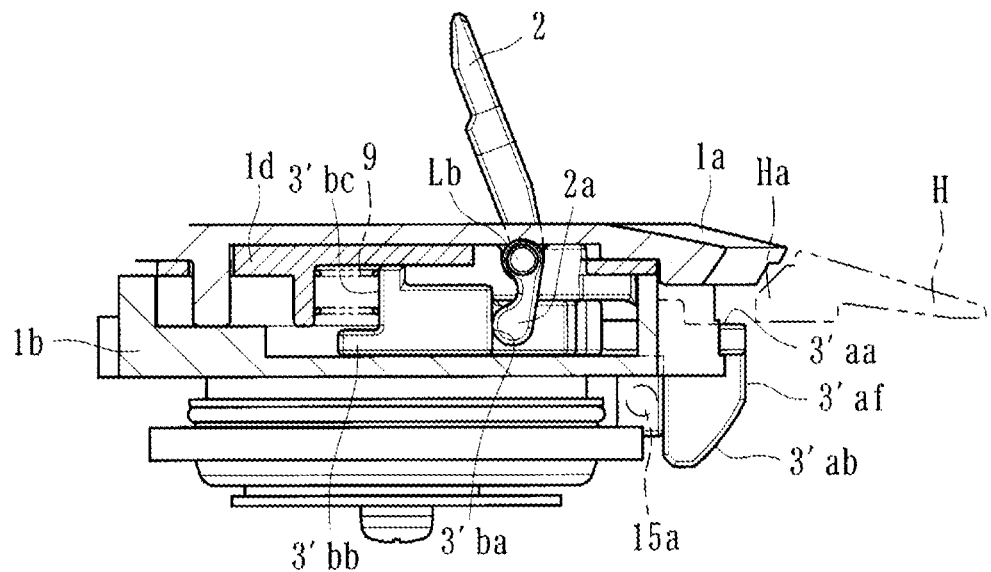

The engagement unit 3' is movable in conjunction with the operation of the operation knob 2, and operates between the engagement position where a state in which the cap 1 closes the fuel filler port Ta is held (see FIG. 22A), and the allowance position where the engagement is released and an opening operation of the cap 1 is allowed (see FIG. 22B). More specifically, the engagement unit 3' according to the present embodiment is slidable in a substantially linear shape in a working space inside the lower cap portion 1b, and is configured such that when the engagement unit 3' is in the engagement position as shown in FIG. 22A, an engagement portion 3'aa at a tip end is engaged with the engaged portion Ha formed on the cover portion H to restrict the movement of the cap 1 from the closed position to the open position, and when operation knob 2 is operated and the engagement unit 3' is in the allowable position as shown in FIG. 22B, the engagement portion 3'aa is separated from the engaged portion Ha to be disengaged, and the movement of the cap 1 from the closed position to the open position is allowed.

Figure 31:
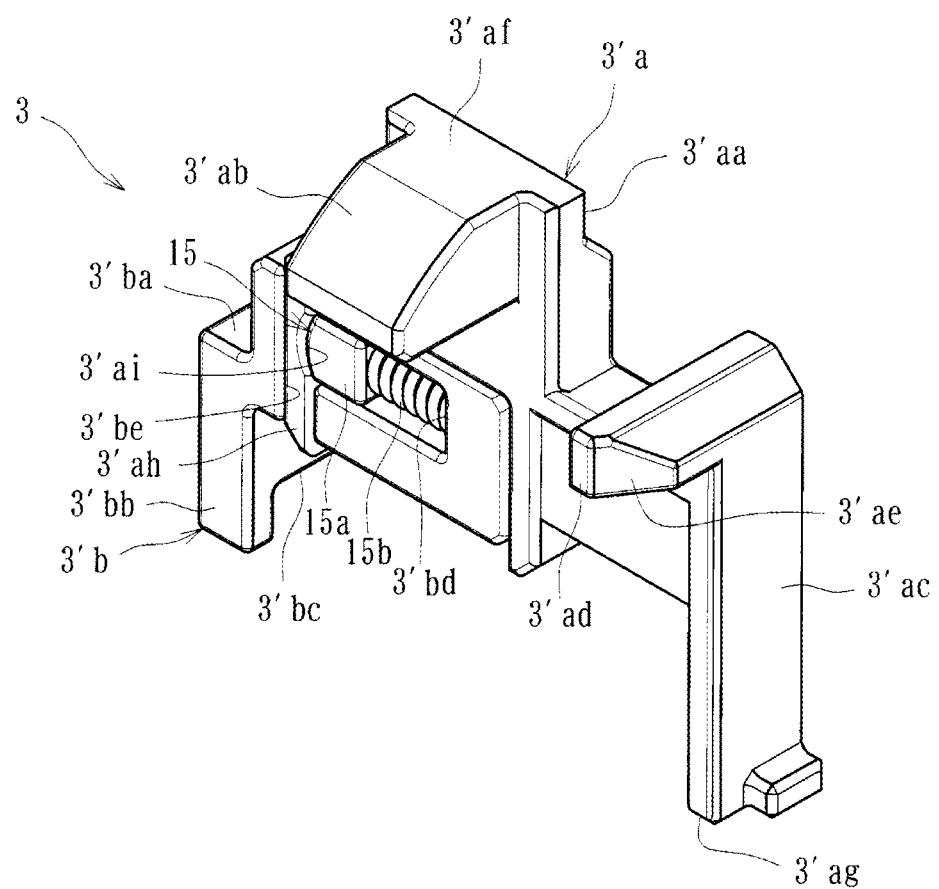
FIG. 31 is a perspective view showing a state in which the first engagement unit and the second engagement unit are connected by the overload preventing unit in the fuel tank cap locking device.
Figure 32:
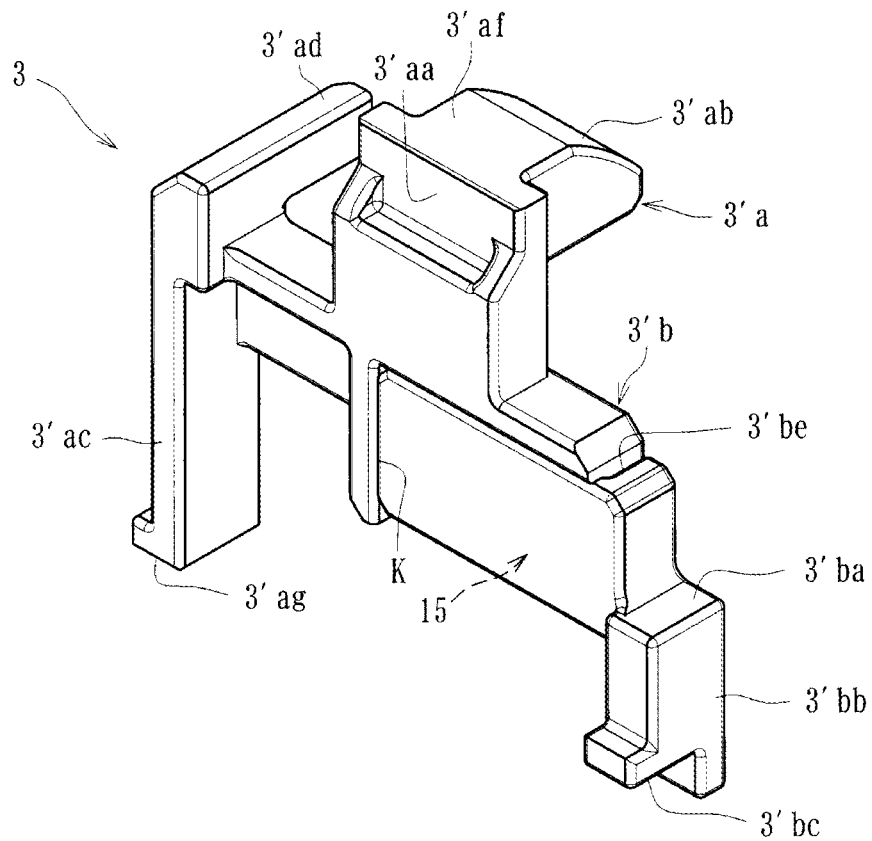
FIG. 32 is a perspective view showing the state in which the first engagement unit and the second engagement unit are connected with the overload preventing unit in the fuel tank cap locking device.

Further, the engagement unit 3' is biased from the allowable position toward the engagement position by the biasing force of the coil spring 9 as shown in FIGS. 22A and 22B, and has a tapered surface 3'ab formed on a back surface side of the engagement portion 3'aa as shown in FIGS. 31 and 32. When the cap 1 is swung from the open position to the closed position, the tapered surface 3'ab interferes with the engaged portion Ha of the cover portion H, and the engagement unit 3' slightly moves toward the allowable position against the biasing force of the coil spring 9. In this way, when the engagement unit 3' moves to reach a position where the tapered surface 3'ab does not interfere with the engaged portion Ha, the cap 1 swings to the closed position and the engagement unit 3' moves to the engagement position by the biasing force of the coil spring 9, so that the engagement portion 3'aa engages with the engaged portion Ha.

Here, as shown in FIGS. 23 to 25 and FIGS. 31 to 33B, the engagement unit 3' according to the present embodiment includes a first engagement unit 3'a having the engagement portion 3'aa that restricts the movement of the cap 1 from the closed position to the open position, and a second engagement unit 3'b receiving an operation force from the operation knob 2. The overload preventing unit 15 is interposed and attached between the first engagement unit 3'a and the second engagement unit 3'b.

Figure 29:
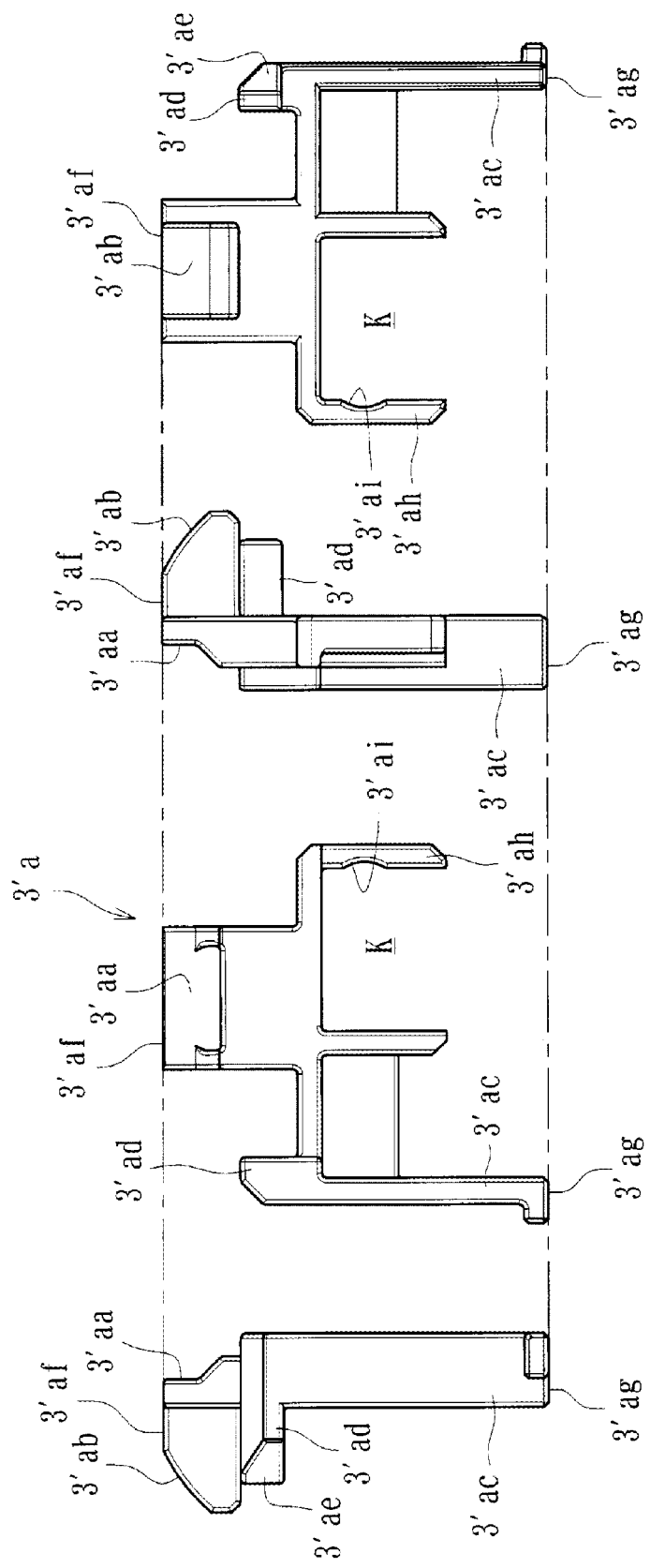
FIG. 29 is a four-side view showing the first engagement unit of the fuel tank cap locking device.

More specifically, as shown in FIG. 29, the first engagement unit 3'a includes the engagement portion 3'aa configured to engage with the engaged portion Ha formed on the cover portion H, the tapered surface 3'ab formed on the back surface side of the engagement portion 3'aa, an extended portion 3'ac extending in a sliding direction of the first engagement unit 3'a, an interfered portion 3'ad formed on a back surface side of the first engagement unit 3'a, a tapered surface 3'ae formed at a predetermined position of the interfered portion 3'ad, and a contact portion 3'af formed on a tip end portion of the first engagement unit 3'a.

Figure 23:
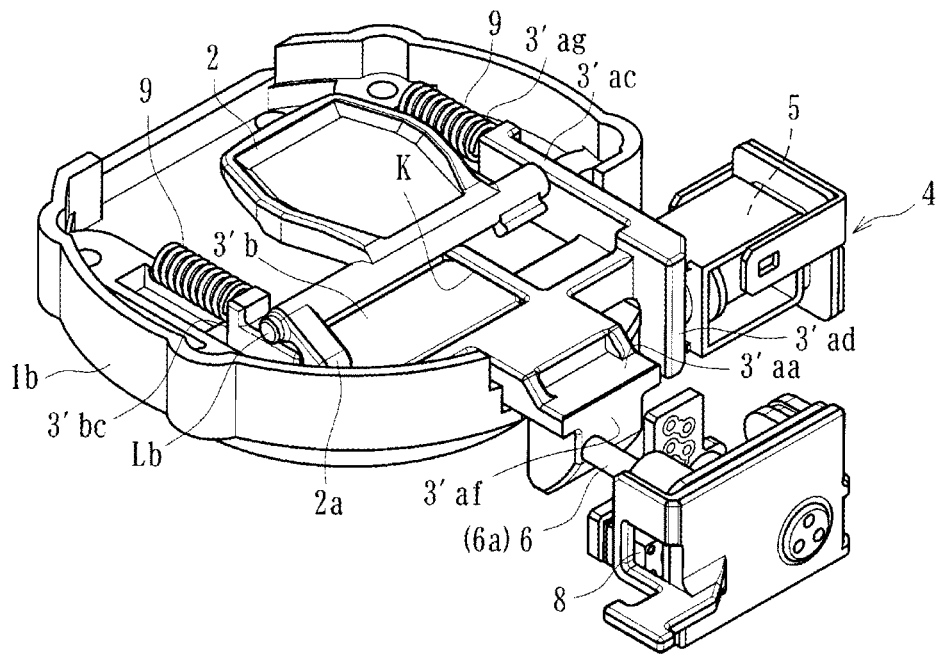
FIG. 23 is a perspective view showing a state in which the operation unit and the engagement unit are assembled in the fuel tank cap locking device.
Figure 24:
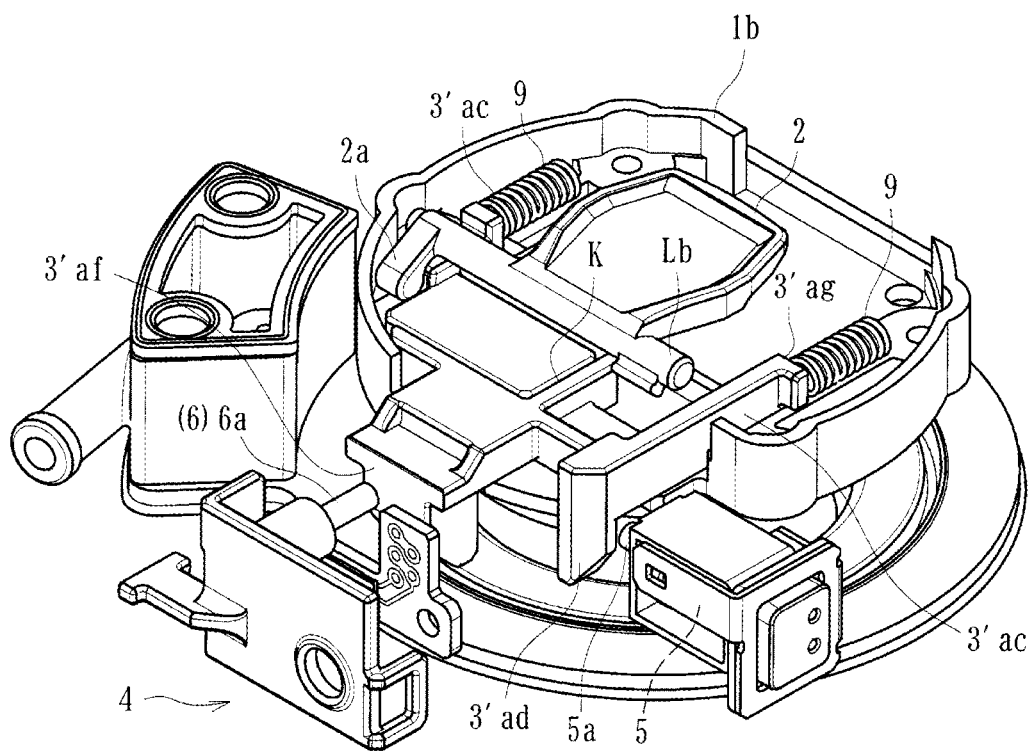
FIG. 24 is a perspective view showing the state in which the operation unit and the engagement unit are assembled in the fuel tank cap locking device.
Figure 25:
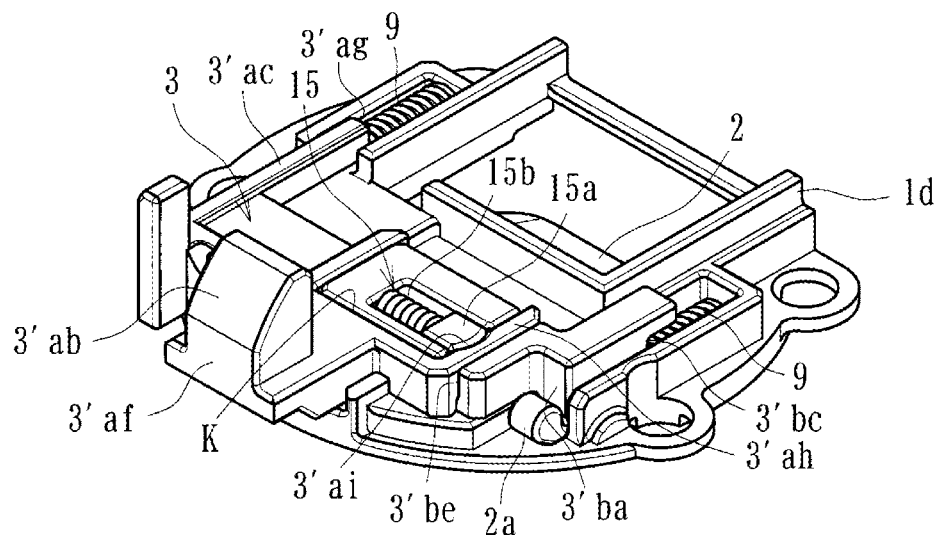
FIG. 25 is a perspective view showing an overload preventing unit connected with a first engagement unit and a second engagement unit in the fuel tank cap locking device.

The first engagement unit 3'a has a fitting portion K into which the second engagement unit 3b can be fitted, an insertion portion 3'ah is extended on one side portion of the fitting portion K, and a recess 3'ai into which a connecting member 15a described later can be fitted is formed at a predetermined position of the insertion portion 3'ah. The extended portion 3'ac is a part integrally extended from the first engagement unit 3'a, and one end of the coil spring 9 can be brought into contact with an end portion 3'ag of the first engagement unit 3'a as shown in FIGS. 23 to 25.

Figure 30:
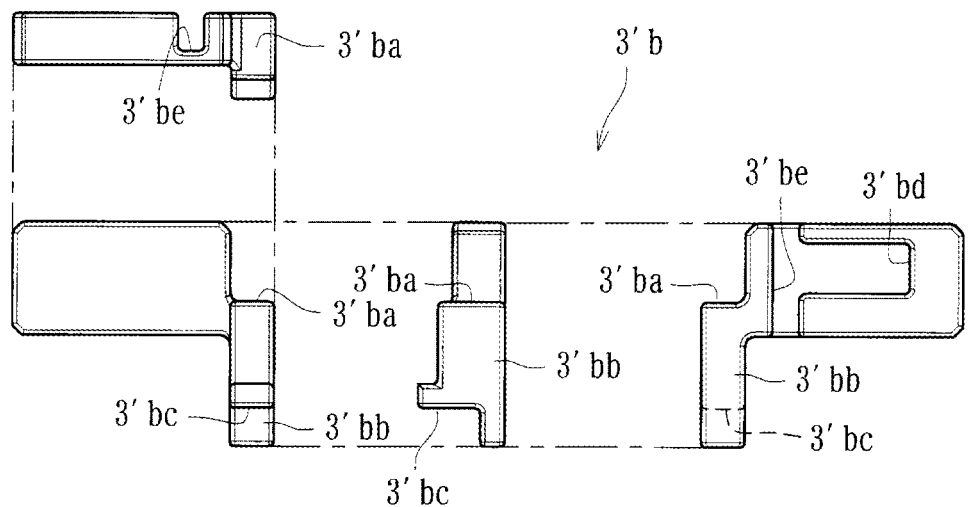
FIG. 30 is a four-side view showing the second engagement unit of the fuel tank cap locking device.

On the other hand, as shown in FIG. 30, the second engagement unit 3'b includes a stepped portion 3'ba to be brought into contact with the protruding portion 2a of the operation knob 2, an extended portion 31b extending in a sliding direction of the second engagement unit 3b, a housing recess 3'bd in which the overload preventing unit 15 can be housed, and an insertion groove 3'be through which the insertion portion 3ah of the first engagement unit 3'a can be inserted. The extended portion 3'bb is a part integrally extended from the second engagement unit 3'b, and one end of the coil spring 9 can be brought into contact with an end portion 3bc of the second engagement unit 3b as shown in FIGS. 23 to 25.

While the insertion portion 3'ah of the first engagement unit 3'a is inserted through the insertion groove 3'be of the second engagement unit 3b, the second engagement unit 3b is fitted into the fitting portion K formed in the first engagement unit 3'a, and the overload preventing unit 15 is housed in the housing recess 3bd of the second engagement unit 3'b, so that the first engagement unit 3'a and the second engagement unit 3'b are connected by the overload preventing unit 15 to obtain the integrated engagement unit 3' as shown in FIGS. 31 to 33B.

The overload preventing unit 15 according to the present embodiment includes the connecting member 15a and a biasing member 15b which are housed in the housing recess 3*bd* of the second engagement unit 3*b*. The overload preventing unit 15 is attached to one of the first engagement unit 3'*a* and the second engagement unit 3*b* (the housing recess 3'*bd* of the second engagement unit 31 in the present embodiment) and applies a biasing force by a biasing unit to the other (the recess 3'*ai* of the first engagement unit 3*a* in the present embodiment), so that the first engagement unit and the second engagement unit can be connected.

The biasing member 15*b*(biasing unit) according to the present embodiment is formed of a coil spring, and is capable of applying a biasing force to the connecting member 15*a*. In a state where the first engagement unit 3'*a* and the second engagement unit 3*b* are assembled, the connecting member 15*a* is pressed by the biasing force of the biasing member 15*b* and fitted into the recess 3'*ai* of the first engagement unit 3'*a*. As a result, the first engagement unit 3'*a* and the second engagement unit 3*b* are connected by the biasing force of the overload preventing unit 15 and can be slid together.

When the operation knob 2 swings around the swing shaft Lb, the stepped portion 3'*ba* of the second engagement unit 3*b* is pressed by the protruding portion 2*a*, and the first engagement unit 3'*a* and the second engagement unit 31 can be integrally moved from the engagement position to the allowable position. Here, the overload prevention unit 15 according to the present embodiment is designed to, when a load of a predetermined amount or more is generated during the swing operation of the operation knob 2, release the load and maintain an engaged state of the engagement unit 3'(the engaged state of the engagement portion 3'*aa* with respect to the engaged portion Ha).

Figure 33A:
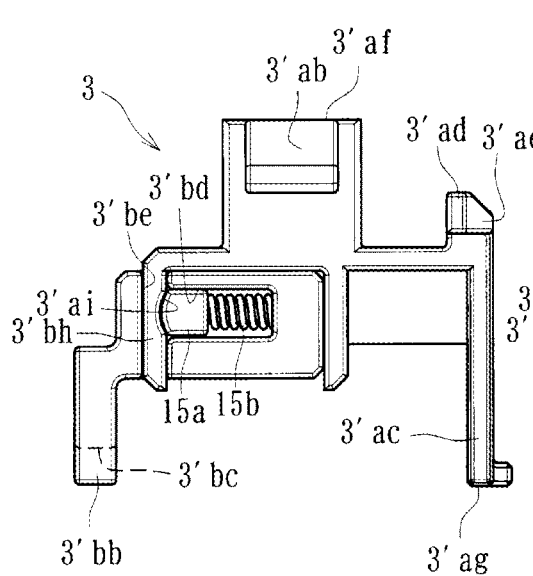
Figure 33B:
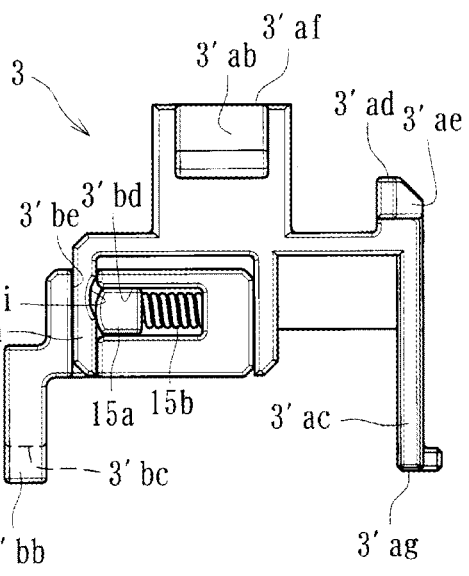

That is, in a swing process of the operation knob 2, when a load of a predetermined amount or more does not occur, as shown in FIG. 33A, the first engagement unit and the second engagement unit are integrally moved to the allowable position, and the engagement of the engagement portion 3'*aa* with respect to the engaged portion Ha is released; when a load of a predetermined amount or more occurs, as shown in FIG. 33B, the connecting member 15*a* is detached from the recess 3'*ai* to release the fitting, and the second engagement unit 3'*b* moves relatively to the first engagement unit 3'*a*, so that the operation force received by the second engagement unit 3'*b* is not transmitted to the first engagement unit 3'*a*.

In the engagement unit 3' according to the present embodiment, a connecting force between the first engagement unit 3'*a* and the second engagement unit 3'*b* is maintained by the biasing force of the biasing member 15*b* of the overload preventing unit 15, and when a load equal to or greater than the connecting force (the load of a predetermined amount or more) is generated during the swing operation of the operation unit, the connection between the first engagement unit 3'*a* and the second engagement unit 3'*b* is released, and the load is released by relative movement.

Further, in the present embodiment, the lock unit is provided to lock movement of the engagement unit 3' from the engagement position to the allowable position, or to release the lock to allow the movement of the engagement unit 3' from the engagement position to the allowable position. Specifically, as in the first embodiment, the lock unit according to the present embodiment is formed of the solenoid 5 with a plunger 5*a* whose position is changeable by energization, and the plunger 5*a* configures a lock member that is movable between an interference position where the plunger 5*a* interferes with the interfered portion 3'*ad* formed at a predetermined position of the engagement unit 3' (first engagement unit 3'*a*) and locks, and a non-interference position where the plunger 5*a* does not interfere with the interfered portion 3'*ad* and the lock is released when the engagement unit 3' moves from the engagement position to the allowable position by the swing operation of the operation knob 2.

The position of the plunger 5*a* can be changed between a protruding state and a contracted state by energization, and is set to the interference position under the protruding state and to the non-interference position under the contracted state, and the plunger 5*a* is constantly biased in a direction from the contracted state (non-interference position) to the protruding state (interference position) by a spring (not shown) formed inside the solenoid 5. That is, when the plunger 5*a* is not energized, the plunger 5*a* is in the protruding state (interference position) due to the biasing force of the spring provided therein such that the engagement unit 3' is locked, and when the plunger 5*a* is energized, the plunger 5*a* is in the contracted state (non-interference position) against the biasing force of the spring therein such that the engagement unit 3' is unlocked.

On the other hand, as shown in FIG. 26, the interfered portion 3'*ad* according to the present embodiment is a portion integrally formed on the back surface side of the engagement unit 3' and protruding downward. When there is an attempt to move the engagement unit 3' from the engagement position to the allowable position while the cap 1 is in the closed position, the plunger 5*a* in the interference position interferes with a side surface of the interfered portion 3'*ad* to restrict the movement of the engagement unit 3' toward the allowable position and lock the engagement unit 3' when the plunger 5*a* is moved from the interference position to the non-interference position by energizing the solenoid 5, the lock is released, so that the engagement unit 3' is allowed to move toward the allowable position, the lock is released, and the cap 1 can be swung to the open position.

Further, the tapered surface 3'*ae* is formed on a protruding end of the interfered portion 3'*ad* so as to come into contact with the plunger 5*a* (lock member) such that the plunger 5*a* is moved from the interference position to the non-interference position when the cap 1 moves from the open position to the closed position. That is, when trying to swing the cap 1 from the open position to the closed position, the tapered surface 3'*ae* of the interfered portion 3'*ad* of the engagement unit 3' is set to come into contact with the plunger 5*a*, and in a process of swinging the cap 1 to the closed position, the tapered surface 3'*ae* can press the plunger 5*a* to move it from the interference position to the non-interference position.

In this way, when the plunger 5*a* moves to reach a position (non-interference position) where the plunger 5*a* does not interfere with the interfered portion 3'*ad*, the cap 1 can be swung to the closed position, and then the plunger 5*a* is returned to the interference position by the spring provided therein. Therefore, when the cap 1 is swung from the open position to the closed position, a swinging force can naturally move the plunger 5*a* from the interference position to the non-interference position, so that the operability can be improved.

Figure 34:
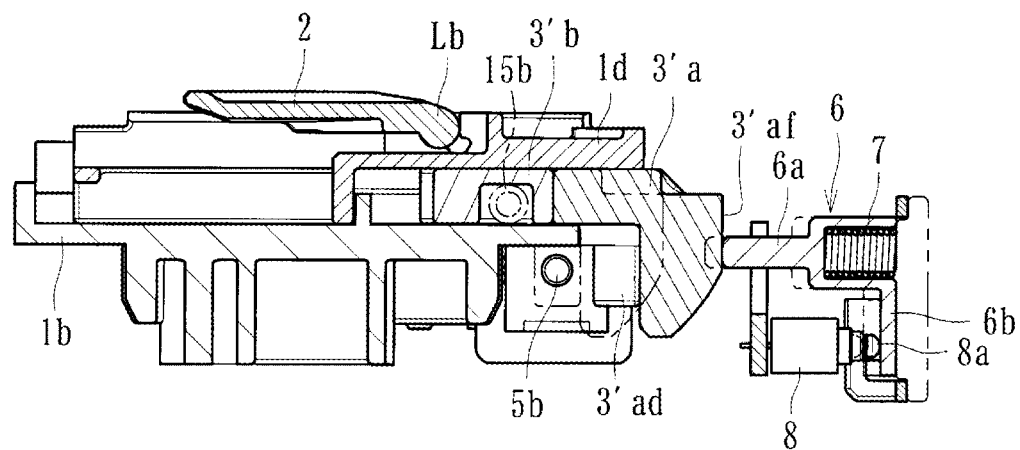
FIG. 34 is a schematic view showing a positional relationship between a slider and a detection switch in the fuel tank cap locking device.

Further, as in the first embodiment, in the present embodiment, the slider 6 interlocking with the engagement unit 3', and the detection switch 8 capable of detecting the movement of the slider 6 are provided, and the lock can be released by the solenoid 5 (lock unit) on condition that the detection switch 8 detects the movement of the slider 6. Specifically, as shown in FIG. 34, the slider 6 is biased to the left side in the figure by the coil spring 7, and is assembled with the protruding end of the protruding portion 6*a* being in contact with the contact portion 3'af of the engagement unit 3'(first engagement unit 3'a).

The slider 6 has a pressing surface 6b capable of pressing an operation portion 8a of the detection switch 8 at a position different from the protruding portion 6a, and is configured such that the pressing surface 6b presses the operation portion 8a to electrically turn on the detection switch 8, or the pressing surface 6b is separated from the operation portion 8a to electrically turn off the detection switch 8, depending on the movement of the slider 6.

When the engagement unit 3' is in the engagement position, the slider 6 is in a state in which the pressing surface 6b is separated from the operation portion 8a, and the detection switch 8 is in an electrically off state. When the operation knob 2 is started and the engagement unit 3' starts to move from the engagement position toward the allowable position, the slider 6 moves in the same direction following the engagement unit 3' by the biasing force of the coil spring 7, the pressing surface 6b presses the operation portion 8a, and the detection switch 8 is electrically turned on. In this way, when the detection switch 8 detects the movement of the slider 6 and is electrically turned on, the solenoid 5 is energized and the lock is released. Therefore, by continuously operating the operation knob 2, the engagement unit 3' is moved to the allowable position.

In addition, as in the first embodiment, a vehicle applied to the present embodiment has the transmission unit 11 that can be carried by a driver and is configured to transmit a vehicle-specific ID code by radio waves, the receiving unit 12 that is arranged on a vehicle side and capable of receiving the ID code from the transmission unit 11, and the determination unit 13 that determines whether the ID code received by the receiving unit 12 is authorized for the vehicle (see FIG. 18); and transmits a control signal to the ECU 14 to permit engine start on condition that the determination unit 13 determines that the received ID code is authorized.

Further, the determination unit 13 according to the present embodiment is electrically connected to the detection switch 8, and on condition that the determination unit 13 determines that a received ID code is authorized and the movement of the engagement unit 3' is detected by the detection switch 8, the plunger 5a of the solenoid 5 is set in the contracted state to the non-interference position, so that the lock is released. That is, in a case where the determination unit 13 determines that a received ID code is authorized, and the start of movement of the engagement unit 3' is detected by the detection switch 8, the plunger 5a of the solenoid 5 is moved from the protruding state (interference position) to the contracted state (non-interference position) to release the lock of the lock unit, and the movement of the engagement unit 3' from the engagement position to the allowable position is allowed; while in a case where the determination unit 13 determines that a received ID code is not authorized, even if the start of movement of the engagement unit 3' is detected by the detection switch 8, the plunger 5a of the solenoid 5 is kept in the protruding state (interference position) so that the lock release operation is not performed by the lock unit.

According to the present embodiment, the lock unit (solenoid 5) includes the lock member (plunger 5a) that is movable between the interference position where the plunger 5a interferes with the interfered portion 3'ad formed at the predetermined position of the engagement unit 3' and locks, and the non-interference position where the plunger 5a does not interfere with the interfered portion 3'ad and the lock is released when the engagement unit 3' moves from the engagement position to the allowable position by the swing operation of the operation knob 2. Therefore, when the cap 1 is in the open position, erroneous operation of the lock unit can be prevented, and when swinging the cap 1 to the closed position, the lock can be reliably performed by the lock unit.

That is, according to the present embodiment, the engagement unit 3' is directly locked or unlocked as compared with one in related art that locks or unlocks a slider interlocking with the engagement unit 3', so that erroneous operation of the lock unit can be prevented when the cap 1 is in the open position. Further, there is no fitting recess for fitting in the engagement unit 3 as in related art, so that there is no problem like foreign matter being clogged in the fitting recess, and a problem generated when the cap 1 swings to the closed position can be avoided.

When the cap 1 moves from the open position to the closed position, the lock member (plunger 5a) according to the present embodiment is pressed by the interfered portion 3'ad and moved from the interference position to the non-interference position, so that the cap 1 can swing to the closed position without being interfered by the lock member, and the engagement unit 3' in the engagement position can be reliably locked by the lock unit.

Further, the interfered portion 3'ad according to the present embodiment is formed with the taper surface 3'ae that comes into contact with the lock member (plunger 5a) such that the plunger 5a is moved from the interference position to the non-interference position when the cap 1 moves from the open position to the closed position, so that the lock member can be smoothly moved from the interference position to the non-interference position. In particular, the lock unit according to the present embodiment is formed of the solenoid 5 with the plunger 5a whose position is changeable by energization, and the lock member is formed of the plunger 5a, so that the responsiveness is high and the engagement unit 3' can be locked or unlocked reliably.

Further, the slider 6 interlocking with the engagement unit 3', and the detection switch 8 capable of detecting the movement of the slider 6 are provided, and the lock can be released by the lock unit on condition that the detection switch 8 detects the movement of the slider 6, so that the movement of the engagement unit 3' can be detected by the detection switch 8 via the slider 6. Therefore, the arrangement position and the arrangement direction (the direction in which the operation portion 8a is pressed) of the detection switch 8 can be optionally set, and the degree of freedom of layout can be improved.

In addition, the transmission unit 11 that can be carried by a driver and is configured to transmit a vehicle-specific ID code, the receiving unit 12 that is arranged on a vehicle side and capable of receiving the 1D code from the transmission unit, and the determination unit 13 that determines whether the ID code received by the receiving unit 12 is authorized for the vehicle are provided, and the lock can be released by the locking unit only when the determination unit 13 determines that a received ID code is authorized. Therefore, it is possible to prevent a third party from illegally unlocking by the lock unit, so as to improve the prevention of crime.

In particular, the lock is released by the lock unit on condition that the determination unit 13 determines that a received ID code is authorized and the movement of the engagement unit 3' is detected, so that the lock can be released in the process of operating the operation knob 2, and the operability can be improved as compared with, for example, a case where the lock is released by a separate operation unit (access switch or the like) attached to the vehicle side.

In addition, according to the present embodiment, the overload preventing unit 15 is provided to, when a load of a predetermined amount or more is generated during the swing operation of the operation knob 2, release the load and maintain the engaged state of the engagement unit 3', so that it is possible to prevent damage or deformation of the operation knob 2 or the engagement unit 3' due to overload during operation of the operation knob 2, and to prevent a third party from illegally releasing, by operating the operation knob 2 with an excessive force, the engagement of the engagement unit 3' locked by the lock unit, thereby improving the prevention of crime.

The overload preventing unit 15 according to the present embodiment is interposed and attached between the first engagement unit 3'a and the second engagement unit 3'b, and is configured such that in the swing process of the operation knob 2, the first engagement unit 3'a and the second engagement unit 3'b are integrally moved when a load of a predetermined amount or more does not occur, and an operation force received by the second engagement unit 3b is not transmitted to the first engagement unit 3'a when a load of a predetermined amount or more occurs, so that the overload generated during the swing operation of the operation knob 2 can be released reliably and smoothly.

Further, the overload preventing unit 15 according to the present embodiment connects the first engagement unit 3'a and the second engagement unit 3'b by being attached to one of the first engagement unit 3'a and the second engagement unit 3b and applying a biasing force by the biasing member 15b (biasing unit) to the other, so that by adjusting the biasing force of the biasing member 15b, the connecting force between the first engagement unit 3'a and the second engagement unit 3'b can be adjusted, and the load of a predetermined amount or more can be optionally adjusted.

The embodiments have been described above, but the present invention is not limited thereto. For example, the lock unit is not limited to the solenoid 5, and may be another actuator or the like as long as the lock unit includes a lock member that is movable between the interference position where the lock member interferes with the interfered portion (3d, 3'ad) formed at a predetermined position of the engagement unit (3, 3') and locks, and a non-interference position where the lock member does not interfere with the interfered portion (3d, 3'ad) and the lock is released when the engagement unit 3 moves from the engagement position to the allowable position by the swing operation of the operation knob 2 (operation unit).

In the first embodiment, the solenoid 5 as the lock unit, the slider 6, and the detection switch 8 are integrated in the unit 4, but the components may be separately arranged without the unit 4. Further, in the first and second embodiments, the movement of the engagement unit 3 is detected by the detection switch 8 via the slider 6, but the movement of the engagement unit 3 may be directly detected by the detection switch 8.

In addition, the overload preventing unit 15 according to the second embodiment connects the first engagement unit 3'a and the second engagement unit 3b by being attached to the second engagement unit 3'b and applying a biasing force by the biasing member 15b (biasing unit) to the first engagement unit 3'a, but the overload preventing unit 15 may also connect the first engagement unit 3'a and the second engagement unit 3'b by being attached to the first engagement unit 3'a and applying a biasing force by the biasing member 15b (biasing unit) to the second engagement unit 3'b.

Further, the overload preventing unit 15 according to the second embodiment has a structure in which the connecting member 15a is biased by the biasing member 15b, but the overload preventing unit 15 may have another structure (for example, the biasing member 15b is another biasing unit or the connecting force between the first engagement unit 3'a and the second engagement unit 3b is maintained solely by frictional force). An applied vehicle may be a buggy, a snow vehicle or the like in addition to an automobile or a motorcycle.

The fuel tank cap locking device is one in which the lock unit includes a lock member that is movable between an interference position where the lock member interferes with an interfered portion formed at a predetermined position of the engagement unit and locks, and a non-interference position where the lock member does not interfere with the interfered portion and the lock is released when the engagement unit moves from the engagement position to the allowable position by the swing operation of the operation unit, and can be applied to a device having a different external shape or a device having other functions.

According to an aspect of the invention, there is provided a fuel tank cap locking device comprising: a cap that is configured to open and close a fuel filler port leading to a fuel tank of a vehicle by moving between a closed position where the fuel filler port is closed, and an open position where the fuel filler port is opened; an operation unit that is configured to be allowed to perform a swing operation around a swing shaft by an operator; an engagement unit that is movable in conjunction with the swing operation of the operation unit, and that is configured to operate between an engagement position where a state in which the cap closes the fuel filler port is held, and an allowable position where engagement is released and an opening operation of the cap is allowed; and a lock unit that is configured to lock movement of the engagement unit from the engagement position to the allowable position, or release lock to allow the movement of the engagement unit from the engagement position to the allowable position, wherein the lock unit includes a lock member that is movable between an interference position where the lock member interferes with an interfered portion formed at a predetermined position of the engagement unit and locks, and a non-interference position where the lock member does not interfere with the interfered portion and the lock is released when the engagement unit moves from the engagement position to the allowable position by the swing operation of the operation unit.

According to the above aspect of the invention, the lock unit includes the lock member that is movable between the interference position where the lock member interferes with the interfered portion formed at the predetermined position of the engagement unit and locks, and the non-interference position where the lock member does not interfere with the interfered portion and the lock is released when the engagement unit moves from the engagement position to the allowable position by the swing operation of the operation unit. Therefore, when the cap is in the open position, erroneous operation of the lock unit can be prevented, and when swinging the cap to the closed position, the lock can be reliably performed by the lock unit.

The lock member may be pressed by the interfered portion and moved from the interference position to the non-interference position when the cap moves from the open position to the closed position.

In this case, when the cap moves from the open position to the closed position, the lock member is pressed by the interfered portion and moved from the interference position to the non-interference position, so that the cap can swing to the closed position without being interfered by the lock member, and the engagement unit in the engagement position can be reliably locked by the lock unit.

The interfered portion may be formed with a tapered surface that comes into contact with the lock member such that the lock member is moved from the interference position to the non-interference position when the cap moves from the open position to the closed position.

In this case, the interfered portion is formed with the taper surface that comes into contact with the lock member such that the lock member is moved from the interference position to the non-interference position when the cap moves from the open position to the closed position, so that the lock member can be smoothly moved from the interference position to the non-interference position.

The lock unit may include a solenoid with a plunger whose position is changeable by energization, and the lock member may include the plunger.

In this case, the lock unit includes the solenoid with the plunger whose position is changeable by energization, and the lock member includes the plunger, so that the responsiveness is high and the engagement unit can be locked or unlocked reliably.

The fuel tank cap locking device may further comprise: a slider that is configured to interlock with the engagement unit; and a detection switch that is configured to detect movement of the slider. Lock may be released by the lock unit on condition that the detection switch detects the movement of the slider.

In this case, the slider interlocking with the engagement unit, and the detection switch capable of detecting the movement of the slider are provided, and the lock can be released by the lock unit on condition that the detection switch detects the movement of the slider, so that the movement of the engagement unit can be detected by the detection switch via the slider. Therefore, the arrangement position and the arrangement direction of the detection switch can be optionally set, and the degree of freedom of layout can be improved.

The fuel tank cap locking device may further comprise: a transmission unit that is carried by a driver, and that is configured to transmit a vehicle-specific ID code; a receiving unit that is arranged on a vehicle side, and that is capable of receiving the ID code from the transmission unit; and a determination unit that is configured to determine whether the ID code received by the receiving unit is authorized for the vehicle. The lock may be released by the lock unit only in a case where the determination unit determines that the received ID code is authorized.

In this case, the transmission unit that can be carried by a driver and is configured to transmit a vehicle-specific ID code, the receiving unit that is arranged on a vehicle side and capable of receiving the ID code from the transmission unit, and the determination unit that determines whether the ID code received by the receiving unit is authorized for the vehicle are provided, and the lock can be released by the locking unit only when the determination unit determines that a received ID code is authorized. Therefore, it is possible to prevent a third party from illegally unlocking by the lock unit, so as to improve the prevention of crime.

The lock may be released by the lock unit on condition that the determination unit determines that the received ID code is authorized, and movement of the engagement unit is detected.

In this case, the lock is released by the lock unit on condition that the determination unit determines that a received ID code is authorized and the movement of the engagement unit is detected, so that the lock can be released in the process of operating the operation unit, and the operability can be improved.

The fuel tank cap locking device may further comprise: an overload preventing unit that is configured to, when a load of a predetermined amount or more is generated during the swing operation of the operation unit, release the load and maintain an engaged state of the engagement unit.

In this case, the overload preventing unit is provided to, when a load of a predetermined amount or more is generated during the swing operation of the operation unit, release the load and maintain the engaged state of the engagement unit, so that it is possible to prevent damage or deformation of the operation unit or the engagement unit due to overload during operation of the operation unit, and to prevent a third party from illegally releasing, by operating the operation unit with an excessive force, the engagement of the engagement unit locked by the lock unit, thereby improving the prevention of crime.

The engagement unit may include: a first engagement unit that includes an engagement portion configured to restrict movement of the cap from the closed position to the open position; and a second engagement unit that is configured to receive an operation force from the operation unit. The overload preventing unit may be interposed and attached between the first engagement unit and the second engagement unit, and be configured such that during a swing process of the operation unit, the first engagement unit and the second engagement unit are integrally moved when the load of the predetermined amount or more does not occur, and the operation force received by the second engagement unit is not transmitted to the first engagement unit when the load of the predetermined amount or more occurs.

In this case, the overload preventing unit is interposed and attached between the first engagement unit and the second engagement unit, and is configured such that in the swing process of the operation unit, the first engagement unit and the second engagement unit are integrally moved when a load of a predetermined amount or more does not occur, and an operation force received by the second engagement unit is not transmitted to the first engagement unit when a load of a predetermined amount or more occurs, so that the overload generated during the swing operation of the operation unit can be released reliably and smoothly.

The overload preventing unit may be configured to connect the rust engagement unit and the second engagement unit by being attached to one of the first engagement unit and the second engagement unit and applying a biasing force by a biasing unit to the other.

In this case, the overload preventing unit connects the first engagement unit and the second engagement unit by being attached to one of the first engagement unit and the second engagement unit and applying a biasing force by the biasing unit to the other, so that by adjusting the biasing force of the biasing unit, the connecting force between the first engagement unit and the second engagement unit can be adjusted, and the load of a predetermined amount or more can be optionally adjusted.

What is claimed is:

1. A fuel tank cap locking device comprising:
   a cap that is configured to open and close a fuel filler port leading to a fuel tank of a vehicle by moving between a closed position where the fuel filler port is closed, and an open position where the fuel filler port is opened;
   an operation unit that is configured to be allowed to perform a swing operation around a swing shaft by an operator;

an engagement unit that is movable in conjunction with the swing operation of the operation unit, and that is configured to operate between an engagement position where a state in which the cap closes the fuel filler port is held, and an allowable position where engagement is released and an opening operation of the cap is allowed; and a lock unit that is configured to lock movement of the engagement unit from the engagement position to the allowable position, or release a lock to allow the movement of the engagement unit from the engagement position to the allowable position, a slider that is configured to interlock with the engagement unit;

a detection switch that is configured to detect movement of the slider, wherein the lock is released by the lock unit on condition that the detection switch detects the movement of the slider, and wherein the lock unit includes a lock member that is movable between an interference position where the lock member interferes with an interfered portion formed at a predetermined position of the engagement unit and locks, and a non-interference position where the lock member does not interfere with the interfered portion and the lock is released when the engagement unit moves from the engagement position to the allowable position by the swing operation of the operation unit.

2. The fuel tank cap locking device according to claim 1, wherein the lock member is pressed by the interfered portion and moved from the interference position to the non-interference position when the cap moves from the open position to the closed position.

3. The fuel tank cap locking device according to claim 2, wherein the interfered portion is formed with a tapered surface that comes into contact with the lock member such that the lock member is moved from the interference position to the non-interference position when the cap moves from the open position to the closed position.

4. The fuel tank cap locking device according to claim 1, wherein the lock unit includes a solenoid with a plunger whose position is changeable by energization, and the lock member includes the plunger.

5. The fuel tank cap locking device according to claim 1, further comprising:

a transmission unit that is carried by a driver, and that is configured to transmit a vehicle specific ID code;

a receiving unit that is arranged on a vehicle side, and that is capable of receiving the ID code from the transmission unit; and a determination unit that is configured to determine whether the ID code received by the receiving unit is authorized for the vehicle, wherein the lock is released by the lock unit only in a case where the determination unit determines that the received ID code is authorized.

6. The fuel tank cap locking device according to claim 5, wherein the lock is released by the lock unit on condition that the determination unit determines that the received ID code is authorized, and movement of the engagement unit is detected.

7. The fuel tank cap locking device according to claim 1, further comprising:

an overload preventing unit that is configured to, when a load of a predetermined amount or more is generated during the swing operation of the operation unit, release the load and maintain an engaged state of the engagement unit.

8. The fuel tank cap locking device according to claim 7, wherein the engagement unit includes:

a first engagement unit that includes an engagement portion configured to restrict movement of the cap from the closed position to the open position; and a second engagement unit that is configured to receive an operation force from the operation unit, and wherein the overload preventing unit is interposed and attached between the first engagement unit and the second engagement unit, and is configured such that during a swing process of the operation unit, the first engagement unit and the second engagement unit are integrally moved when the load of the predetermined amount or more does not occur, and the operation force received by the second engagement unit is not transmitted to the first engagement unit when the load of the predetermined amount or more occurs.

9. The fuel tank cap locking device according to claim 8, wherein the overload preventing unit is configured to connect the first engagement unit and the second engagement unit by being attached to one of the first engagement unit and the second engagement unit and applying a biasing force by a biasing unit to the other.

* * * * *

UNITED STATES PATENT AND TRADEMARK OFFICE
CERTIFICATE OF CORRECTION

PATENT NO. : 11,685,255 B2
APPLICATION NO. : 16/892969
DATED : June 27, 2023
INVENTOR(S) : Yohei Mimura It is certified that error appears in the above-identified patent and that said Letters Patent is hereby corrected as shown below:

In the Specification

Column 9, Line 4, "preventing unit 1S. In the" should be -- preventing unit 15. In the --.

Column 9, Line 7, "portion His fixed to" should be -- portion H is fixed to --.

Column 10, Line 33, "unit 3b can be fitted," should be -- unit 3'b can be fitted, --.

Column 10, Line 45, "portion 31b extending" should be -- portion 3'bb extending --.

Column 10, Line 46, "engagement unit 3b" should be -- engagement unit 3'b --.

Column 10, Line 53, "portion 3bc of the" should be -- portion 3'bc of the --.

Column 10, Line 53, "unit 3b as shown in" should be -- unit 3'b as shown in --.

Column 10, Line 57, "unit 3b, the second" should be -- unit 3'b, the second --.

Column 10, Line 57, "engagement unit 3b" should be -- engagement unit 3'b --.

Column 10, Line 60, "recess 3bd of the second" should be -- recess 3'bd of the second --.

Column 11, Line 1, "3bd of the second" should be -- 3'bd of the second --.

Column 11, Line 1, "unit 3b. The overload" should be -- unit 3'b. The overload --.

Column 11, Line 6, "engagement unit 3a in" should be -- engagement unit 3'a in --.

Column 11, Line 13, "unit 3b are assembled," should be -- unit 3'b are assembled --.

Signed and Sealed this
Nineteenth Day of March, 2024

*Katherine Kelly Vidal*
Katherine Kelly Vidal
*Director of the United States Patent and Trademark Office*

CERTIFICATE OF CORRECTION (continued)
U.S. Pat. No. 11,685,255 B2

Column 11, Line 17, "unit 3b are connected by" should be -- unit 3'b are connected by --.

Column 11, Line 22, "3b is pressed by the" should be -- 3'b is pressed by the --.

Column 11, Line 23, "engagement unit 31 can" should be -- engagement unit 3'b can --.